(12) United States Patent
Diankov et al.

(10) Patent No.: US 12,002,007 B2
(45) Date of Patent: *Jun. 4, 2024

(54) ROBOTIC SYSTEM WITH AUTOMATED PACKAGE SCAN AND REGISTRATION MECHANISM AND METHODS OF OPERATING THE SAME

(71) Applicant: MUJIN, Inc., Tokyo (JP)

(72) Inventors: Rosen Nikolaev Diankov, Tokyo (JP); Huan Liu, Tokyo (JP); Xutao Ye, Tokyo (JP); Jose Jeronimo Moreira Rodrigues, Tokyo (JP); Yoshiki Kanemoto, Tokyo (JP); Jinze Yu, Tokyo (JP); Russell Islam, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,117

(22) Filed: Sep. 13, 2022

(65) Prior Publication Data
US 2023/0008540 A1 Jan. 12, 2023

Related U.S. Application Data

(63) Continuation of application No. 16/667,857, filed on Oct. 29, 2019, now Pat. No. 11,501,445.
(Continued)

(51) Int. Cl.
*G06Q 10/08* (2023.01)
*B25J 9/16* (2006.01)
(Continued)

(52) U.S. Cl.
CPC .......... *G06Q 10/087* (2013.01); *B25J 9/1676* (2013.01); *B25J 9/1687* (2013.01);
(Continued)

(58) Field of Classification Search
CPC ......... G06T 7/13; B25J 9/1676; B25J 9/1687; G05B 2219/40006
See application file for complete search history.

(56) References Cited

U.S. PATENT DOCUMENTS

| 4,907,169 A | 3/1990 | Lovoi |
| 5,812,395 A | 9/1998 | Mascianegelo et al. |

(Continued)

FOREIGN PATENT DOCUMENTS

| CN | 1293752 A | 5/2001 |
| CN | 1135201 C | 1/2004 |

(Continued)

OTHER PUBLICATIONS

Non-Final Office Action dated Apr. 18, 2019 for U.S. Appl. No. 16/290,741, filed Mar. 1, 2019, 16 pages.
(Continued)

*Primary Examiner* — Kyle O Logan
(74) *Attorney, Agent, or Firm* — Perkins Coie LLP

(57) ABSTRACT

A system and method for operating a robotic system to scan and register unrecognized objects is disclosed. The robotic system may use an image data representative of an unrecognized object located at a start location to implement operations for transferring the unrecognized object from the start location. While implementing the operations, the robotic system may obtain additional data, including scanning results of one or more portions of the unrecognized object not included in the image data. The robotic system may use the additional data to register the unrecognized object.

20 Claims, 10 Drawing Sheets

Related U.S. Application Data

(60) Provisional application No. 62/852,963, filed on May 24, 2019, provisional application No. 62/752,756, filed on Oct. 30, 2018.

(51) Int. Cl.

| | | |
|---|---|---|
| *B65B 43/46* | (2006.01) | |
| *B65G 61/00* | (2006.01) | |
| *G05B 19/4093* | (2006.01) | |
| *G06Q 10/087* | (2023.01) | |
| *G06T 7/11* | (2017.01) | |
| *G06T 7/13* | (2017.01) | |
| *G06T 7/50* | (2017.01) | |
| *G06T 7/62* | (2017.01) | |
| *G06T 7/73* | (2017.01) | |
| *G06T 19/20* | (2011.01) | |
| *G06V 10/20* | (2022.01) | |
| *G06V 10/25* | (2022.01) | |
| *G06V 20/64* | (2022.01) | |
| *G06V 10/44* | (2022.01) | |

(52) U.S. Cl.
CPC ............ *B25J 9/1697* (2013.01); *B65B 43/46* (2013.01); *B65G 61/00* (2013.01); *G05B 19/40935* (2013.01); *G06T 7/11* (2017.01); *G06T 7/13* (2017.01); *G06T 7/50* (2017.01); *G06T 7/62* (2017.01); *G06T 7/73* (2017.01); *G06T 19/20* (2013.01); *G06V 10/25* (2022.01); *G06V 10/255* (2022.01); *G06V 20/64* (2022.01); *G05B 2219/40006* (2013.01); *G05B 2219/40607* (2013.01); *G06T 2200/04* (2013.01); *G06T 2207/10028* (2013.01); *G06T 2207/20164* (2013.01); *G06T 2207/30108* (2013.01); *G06V 10/44* (2022.01)

(56) References Cited

U.S. PATENT DOCUMENTS

| | | |
|---|---|---|
| 6,272,230 B1 | 8/2001 | Hiraoglu et al. |
| 6,290,454 B1 | 9/2001 | Huang et al. |
| 7,085,622 B2 | 8/2006 | Sadighi et al. |
| 7,646,917 B2 | 1/2010 | Jung et al. |
| 8,571,298 B2 | 10/2013 | McQueen et al. |
| 9,050,719 B2 | 6/2015 | Valpola et al. |
| 9,067,744 B2 | 6/2015 | Takizawa et al. |
| 9,102,055 B1 | 8/2015 | Konolige et al. |
| 9,227,323 B1 | 1/2016 | Konolige et al. |
| 9,233,470 B1 | 1/2016 | Bradski et al. |
| 9,272,417 B2 | 3/2016 | Konolige et al. |
| 9,327,406 B1 | 5/2016 | Hinterstoisser et al. |
| 9,486,921 B1 | 11/2016 | Straszheim et al. |
| 9,630,320 B1 | 4/2017 | Konolige et al. |
| 9,630,321 B2 | 4/2017 | Bradski et al. |
| 9,757,858 B2 | 9/2017 | Eto et al. |
| 9,796,540 B1 | 10/2017 | Shellenbaum et al. |
| 9,862,093 B2 | 1/2018 | Bradski et al. |
| 10,124,489 B2 | 11/2018 | Chitta et al. |
| 10,147,398 B2 | 12/2018 | Koga |
| 10,328,578 B2 | 6/2019 | Holz |
| 10,369,701 B1 | 8/2019 | Diankov et al. |
| 10,471,597 B1 | 11/2019 | Murphy et al. |
| 10,562,188 B1 | 2/2020 | Diankov et al. |
| 10,562,189 B1 | 2/2020 | Diankov et al. |
| 10,614,340 B1 | 4/2020 | Yu et al. |
| 10,625,952 B1 | 4/2020 | Luthra et al. |
| 10,703,584 B2 | 7/2020 | Diankov et al. |
| 11,034,025 B2 | 6/2021 | Diankov et al. |
| 11,062,457 B2 | 7/2021 | Yu et al. |
| 11,068,679 B2 | 7/2021 | Rodriguez et al. |
| 11,176,674 B2 | 11/2021 | Diankov et al. |
| 11,189,033 B2 | 11/2021 | Yu et al. |
| 11,288,810 B2 | 3/2022 | Diankov et al. |
| 11,501,445 B2 | 11/2022 | Diankov et al. |
| 11,636,605 B2 | 4/2023 | Yu et al. |
| 2002/0106273 A1 | 8/2002 | Huang et al. |
| 2007/0177011 A1 | 8/2007 | Lewin et al. |
| 2007/0177790 A1 | 8/2007 | Ban et al. |
| 2009/0028686 A1 | 1/2009 | Tallis et al. |
| 2010/0004778 A1 | 1/2010 | Arimatsu et al. |
| 2010/0052152 A1 | 3/2010 | Mishra et al. |
| 2010/0082152 A1* | 4/2010 | Mishra .................. G06Q 10/08 700/226 |
| 2010/0222915 A1 | 9/2010 | Kuehnemann et al. |
| 2011/0216185 A1 | 9/2011 | Laws et al. |
| 2011/0218670 A1 | 9/2011 | Bell et al. |
| 2013/0096713 A1 | 4/2013 | Takizawa et al. |
| 2013/0211593 A1 | 8/2013 | Domae et al. |
| 2014/0052555 A1 | 2/2014 | MacIntosh |
| 2015/0066199 A1 | 3/2015 | Shimono |
| 2015/0203304 A1 | 7/2015 | Morency et al. |
| 2015/0262012 A1 | 9/2015 | Kim et al. |
| 2016/0016311 A1 | 1/2016 | Konolige et al. |
| 2017/0057146 A1 | 3/2017 | Altonen et al. |
| 2017/0057148 A1 | 3/2017 | Altonen et al. |
| 2017/0076469 A1 | 3/2017 | Sonoura et al. |
| 2017/0137236 A1 | 5/2017 | Sonoura et al. |
| 2017/0177746 A1 | 6/2017 | Gotou |
| 2017/0246744 A1* | 8/2017 | Chitta .................... B25J 9/1687 |
| 2018/0126553 A1 | 5/2018 | Corkum et al. |
| 2018/0198983 A1 | 7/2018 | Fukuya et al. |
| 2018/0243904 A1 | 8/2018 | Bradski |
| 2018/0253516 A1 | 9/2018 | Shimano et al. |
| 2018/0304468 A1 | 10/2018 | Holz |
| 2019/0206059 A1 | 7/2019 | Landman |
| 2020/0279084 A1 | 9/2020 | Davis et al. |
| 2020/0302207 A1 | 9/2020 | Perkins et al. |
| 2021/0129334 A1 | 5/2021 | Kanunikov et al. |
| 2021/0158609 A1 | 5/2021 | Raskob et al. |
| 2021/0260771 A1 | 8/2021 | Diankov et al. |
| 2022/0051411 A1 | 2/2022 | Diankov et al. |
| 2022/0076425 A1 | 3/2022 | Yu et al. |
| 2022/0292278 A1 | 9/2022 | Roberts et al. |
| 2023/0041343 A1 | 2/2023 | Yu et al. |

FOREIGN PATENT DOCUMENTS

| | | |
|---|---|---|
| CN | 1791475 A | 6/2006 |
| CN | 102616578 A | 8/2012 |
| CN | 202539084 U | 11/2012 |
| CN | 103568024 A | 2/2014 |
| CN | 103822594 A | 5/2014 |
| CN | 104608150 A | 5/2015 |
| CN | 103043359 A | 7/2015 |
| CN | 105817430 A | 8/2016 |
| CN | 106063998 A | 11/2016 |
| CN | 106660207 A | 5/2017 |
| CN | 106886165 A | 6/2017 |
| CN | 106945035 A | 7/2017 |
| CN | 107889452 A | 4/2018 |
| CN | 108349083 A | 7/2018 |
| CN | 111566028 A | 8/2020 |
| CN | 111629868 A | 9/2020 |
| DE | 102014016069 A1 | 5/2015 |
| DE | 102015106936 A2 | 11/2015 |
| JP | 03234491 A | 10/1991 |
| JP | H03234491 A | 10/1991 |
| JP | H06171760 A | 6/1994 |
| JP | H07053054 A | 2/1995 |
| JP | 2007097057 A | 4/1995 |
| JP | H0797057 A | 4/1995 |
| JP | H07291450 A | 11/1995 |
| JP | 10031742 A | 2/1998 |
| JP | 2894449 B2 | 5/1999 |
| JP | H11333770 A | 12/1999 |
| JP | 2001058723 A | 3/2001 |
| JP | 2001072247 A | 3/2001 |
| JP | 2002013913 A | 1/2002 |
| JP | 3277739 A | 4/2002 |
| JP | 2003237943 A | 8/2003 |
| JP | 2004050390 A | 2/2004 |

(56) References Cited

FOREIGN PATENT DOCUMENTS

| JP | 3596434 B2 | 12/2004 |
|---|---|---|
| JP | 2005333824 A | 12/2005 |
| JP | 3849514 B2 | 11/2006 |
| JP | 2006300929 A | 11/2006 |
| JP | 2007254128 A | 10/2007 |
| JP | 2008284690 A | 11/2008 |
| JP | 2010247959 A | 11/2010 |
| JP | 2013129034 A | 7/2013 |
| JP | 2013145525 A | 7/2013 |
| JP | 2013246589 A | 12/2013 |
| JP | 5429614 B2 | 2/2014 |
| JP | 2017058130 A | 3/2017 |
| JP | 2017520418 A | 7/2017 |
| JP | 2017149569 A | 8/2017 |
| JP | 2018047544 A | 3/2018 |
| JP | 2018097889 A | 6/2018 |
| JP | 6374993 B2 | 8/2018 |
| JP | 2018131237 A | 8/2018 |
| JP | 2018158439 A | 10/2018 |
| JP | 6461712 B2 | 1/2019 |
| JP | 2019005871 A | 1/2019 |
| JP | 6486114 B2 | 3/2019 |
| JP | 2019509559 A | 4/2019 |
| JP | 2019136828 A | 8/2019 |
| JP | 2021507857 A | 2/2021 |
| WO | 2017146895 A1 | 8/2017 |
| WO | 2018185861 A1 | 10/2018 |

OTHER PUBLICATIONS

Notice of Allowance dated Jun. 7, 2019 for U.S. Appl. No. 16/290,741, filed Mar. 1, 2019, 8 pages.
Non-Final Office Action dated Jul. 12, 2019 for U.S. Appl. No. 16/443,743, filed Jun. 17, 2019, 11 pages.
Notice of Allowance dated Oct. 9, 2019 for U.S. Appl. No. 16/443,743, filed Jun. 17, 2019, 12 pages.
Non-Final Office Action dated Jul. 15, 2019 for U.S. Appl. No. 16/443,757, filed Jun. 17, 2019, 12 pages.
Notice of Allowance dated Oct. 7, 2019 for U.S. Appl. No. 16/443,757, filed Jun. 17, 2019, 12 pages.
Non-Final Office Action dated Nov. 14, 2019 for U.S. Appl. No. 16/539,790, filed Aug. 13, 2019, 16 pages.
Korean Intellectual Property Office, International Application Division, International Search Report and Written Opinion for PCT/US2019/035608 filed Jun. 5, 2018, dated Aug. 29, 2019, 9 pages.
Japanese Patent Office, Notice of Reasons for Rejection for Japanese Application No. 2019-133517, dated Nov. 18, 2019, with English translation, 6 pages.
International Search Report and Written Opinion dated Feb. 19, 2020 for PCT/US2019/058672 filed Oct. 29, 2019, ISA/KR, 10 pages.
International Search Report and Written Opinion dated Feb. 17, 2020 for PCT/US2019/058650 filed Oct. 29, 2019, ISA/KR, 12 pages.
International Search Report and Written Opinion dated Feb. 19, 2020 for PCT/US2019/058656 filed Oct. 29, 2019, ISA/KR, 9 pages.
International Search Report and Written Opinion dated Feb. 20, 2020 for PCT/US2019/058666 filed Oct. 29, 2019, ISA/KR, 10 pages.
International Search Report and Written Opinion dated Feb. 24, 2020 for PCT/US2019/058677 filed Oct. 29, 2019, ISA/KR, 9 pages.
Notice of Allowance dated Mar. 9, 2020 for U.S. Appl. No. 16/539,790, filed Aug. 13, 2019, 19 pages.
Jia, Tong et al., "Depth Measurement Based on Infrared Coded Structured Light," Hindawi Publishing Corporation, Journal of Sensors, vol. 2014, Article ID 852261, 8 pages, published Oct. 19, 2014.
Japanese Patent Office, Decision to Grant Japanese Application No. 2019-133517, dated Mar. 17, 2020, 3 pages.
Japanese Patent Office, Notice of Reasons for Rejection for Japanese Application No. 2020-516651, dated Nov. 9, 2020, with English translation, 6 pages.
Japanese Patent Office, Notice of Reasons for Rejection for Japanese Application No. 2020-515142, dated Nov. 9, 2020, with English translation, 13 pages.
Japanese Patent Office, Notice of Reasons for Rejection for Japanese Application No. 2020-514759, dated Oct. 28, 2020, with English translation, 6 pages.
Japanese Patent Office, Decision to Grant Japanese Application No. 2020-514759, dated Nov. 27, 2020, 3 pages.
Japanese Patent Office, Notice of Reasons for Rejection for Japanese Application No. 2020-514750, dated Oct. 28, 2020, with English translation, 7 pages.
Japanese Patent Office, Decision to Grant Japanese Application No. 2020-514750, dated Nov. 27, 2020, 3 pages.
Japanese Patent Office, Notice of Reasons for Rejection for Japanese Application No. 2020-501166, dated Oct. 28, 2020, 2 pages.
Japanese Patent Office, Decision to Grant Japanese Application No. 2020-501166, dated Nov. 12, 2020, 3 pages.
CIPO Office Action dated Jul. 2, 2020 for Application No. 201910597137.2, 5 pages.
CIPO Office Action dated Jan. 7, 2021 for Application No. 201910597137.2, 3 pages.
Japanese Patent Office, Decision to Grant Japanese Application No. 2020-516651, dated Dec. 2, 2020, 3 pages.
Japanese Patent Office, Decision to Grant Japanese Application No. 2020-515142, dated Dec. 7, 2020, 3 pages.
CIPO Office Action dated Feb. 23, 2021 for Application No. 202010416747.0, 6 pages.
Notice of Allowance dated Feb. 10, 2021 for U.S. Appl. No. 16/736,667, filed Jan. 7, 2020, First Inventor: Rosen Diankov, 23 pages.
CIPO Office Action dated Mar. 3, 2021 for Application No. 202010482376.6, 11 pages.
German Patent Office Office Action dated Nov. 18, 2020 for Application No. 112019000125.6, 7 pages.
CIPO Notice to Grant dated Apr. 7, 2021 for Application No. 201910597137.2, 4 pages.
CIPO Office Action dated Apr. 2, 2021 for Application No. 202010482364.3, 9 pages.
CIPO Office Action dated Apr. 28, 2021 for Application No. 202010539908.5, 12 pages.
CIPO Office Action dated Mar. 19, 2021 for Application No. 202010539927.8, 7 pages.
CIPO Notice to Grant dated Apr. 13, 2021 for Application No. 202010416747.0, 4 pages.
German Patent Office Decision to Grant dated Mar. 16, 2021 for Application No. 112019000125.6, 6 pages.
Notice of Allowance dated Mar. 26, 2021 for U.S. Appl. No. 16/667,822, filed Oct. 29, 2019, 27 pages.
Holz et al., Fast Edge-Based Detection and Localization of Transport Boxes and Pallets in RGB-D Images for Mobile Robot Bin Picking, ISR 2016, Jun. 21-22, 2016, Munich, Germany, pp. 133-140, Year: 2016.
Holz et al., "Real-Time Object Detection, Localization and Verification of Fast Robotic Depalletizing," 978-1-4799-9994-1, IEEE 2015, pp. 1459-1466, Year: 2015.
Doliotis et al., "A 3D Perception-based Robotic Manipulation System for Automated Truck Unloading," 978-1-5090-2409-4, IEEE 2016, pp. 262-267, Year: 2016.
Non-Final Office Action dated Apr. 13, 2021 for U.S. Appl. No. 16/667,882, filed Oct. 29, 2019, 23 pages.
CIPO Notice to Grant dated May 20, 2021 for Application No. 202010539927.8, 4 pages.
International Bureau of WIPO, PCT International Preliminary Report on Patentability for PCT/US2019/035608 filed Jun. 5, 2019, dated May 14, 2021, 6 pages.
International Bureau of WIPO, PCT International Preliminary Report on Patentability for PCT/US2019/058672 filed Oct. 29, 2019, dated May 14, 2021, 7 pages.

(56) References Cited

OTHER PUBLICATIONS

International Bureau of WIPO, PCT International Preliminary Report on Patentability for PCT/US2019/058650 filed Oct. 29, 2019, dated May 14, 2021, 9 pages.
International Bureau of WIPO, PCT International Preliminary Report on Patentability for PCT/US2019/058656 filed Oct. 29, 2019, dated May 14, 2021, 6 pages.
International Bureau of WIPO, PCT International Preliminary Report on Patentability for PCT/US2019/058666 filed Oct. 29, 2019, dated May 14, 2021, 7 pages.
International Bureau of WIPO, PCT International Preliminary Report on Patentability for PCT/US2019/058677 filed Oct. 29, 2019, dated May 14, 2021, 6 pages.
CIPO Notice to Grant dated May 21, 2021 for Application No. 202010482376.6, 4 pages.
CIPO Notice to Grant dated Jul. 2, 2021 for Application No. 202010539908.5, 4 pages.
Notice of Allowance dated Jun. 2, 2021 for U.S. Appl. No. 16/667,822, filed Oct. 29, 2019, 20 pages.
Non-Final Office Action dated Jul. 21, 2021 for U.S. Appl. No. 16/888,376, filed May 29, 2020, 40 pages.
Notice of Allowance dated Jul. 29, 2021 for U.S. Appl. No. 16/667,840, filed Oct. 29, 2019, 35 pages.
Notice of Allowance dated Jul. 2, 2021 for U.S. Appl. No. 16/667,882, filed Oct. 29, 2019, 18 pages.
CIPO Notice to Grant dated Jun. 15, 2021 for Application No. 202010482364.3, 4 pages.
Notice of Allowance dated Nov. 5, 2021 for U.S. Appl. No. 16/888,376, filed May 29, 2020, 13 pages.
Notice of Allowance dated Jun. 7, 2022 for U.S. Appl. No. 16/667,857, filed Oct. 29, 2019, 39 pages.
Non-Final Office Action dated Dec. 12, 2022 for U.S. Appl. No. 17/313,921, filed May 6, 2021, First Named Inventor: Rosen Diankov, 20 pages.
Notice of Allowance dated Dec. 16, 2022 for U.S. Appl. No. 17/344,720, filed Oct. 29, 2019, 16 pages.
Non-Final Office Action dated Dec. 7, 2022 for U.S. Appl. No. 17/512,559, filed Oct. 27, 2021, First Named Inventor: Rosen Nikolaev Diankov, 15 pages.
Japanese Patent Office, Notice of Reasons for Rejection dated Jul. 22, 2022 for Application No. 2022-097954, Applicant: MUJIN, Inc., 14 pages.
Japanese Patent Office, Notice of Reasons for Rejection dated Aug. 25, 2022 for Application No. 2022-097954, Applicant: MUJIN, Inc., 8 pages.
Japanese Patent Office, Decision to Grant Japanese Application No. 2022-097954, dated Oct. 4, 2022, 3 pages.
Notice of Allowance dated Mar. 16, 2023 for U.S. Appl. No. 17/512,559, filed Oct. 27, 2021, First Named Inventor: Rosen Nikolaev Diankov, 14 pages.
Non-Final Office Action dated May 11, 2023 for U.S. Appl. No. 17/527,012, filed Nov. 15, 2021, First Named Inventor: Jinze Yu, 22 pages.
Notice of Allowance dated May May 30, 2023 for U.S. Appl. No. 17/313,921, filed May 6, 2021, First Named Inventor: Rosen Diankov, 26 pages.
Notice of Allowance dated Jun. 9, 2023 for U.S. Appl. No. 17/512,559, filed Oct. 27, 2021, First Named Inventor: Rosen Nikolaev Diankov, 12 pages.
Japanese Patent Office, Notice of Reasons for Rejection for Japanese Application No. 2020-072681, dated Jun. 26, 2023, with English translation, 6 pages.
Japanese Patent Office, Notice of Reasons for Rejection for Japanese Application No. 2020-212616, dated Jul. 25, 2023, with English translation, 6 pages.
KIPO Notice of Reasons for Rejection dated Jun. 30, 2023 for Application No. 9-5-2023-059249101, 3 pages.
KIPO Notice of Reasons for Rejection dated Jun. 30, 2023 for Application No. 9-5-2023-059249246, 4 pages.
German Patent Office Decision to Grant dated Jun. 1, 2023 for Application No. 112019000217.1, 5 pages.
Notice of Allowance dated Aug. 29, 2023 for U.S. Appl. No. 17/527,012, filed Nov. 15, 2021, First Named Inventor: Jinze Yu, 17 pages.
Japanese Patent Office, Decision to Grant Japanese Application No. 2020-216438, dated Jul. 21, 2023, 3 pages.
Japanese Patent Office, Office Action for Japanese Application No. 2020-216162, dated Aug. 5, 2023, 5 pages.
Japanese Patent Office, Office Action for Japanese Application No. 2020-212616, dated Jul. 25, 2023, 5 pages.
Japanese Patent Office, Office Action for Japanese Application No. 2020-213054, dated Aug. 25, 2023, 3 pages.
Japanese Patent Office, Decision to Grant Japanese Application No. 2020-204672, dated Aug. 23, 2023, 3 pages.
Japanese Patent Office, Decision to Grant Japanese Application No. 2020-072681, dated Oct. 19, 2023, 3 pages.

* cited by examiner

ROBOTIC SYSTEM WITH AUTOMATED PACKAGE SCAN AND REGISTRATION MECHANISM AND METHODS OF OPERATING THE SAME

CROSS-REFERENCE TO RELATED APPLICATION(S)

This application is a continuation of U.S. patent application Ser. No. 16/667,857 filed Oct. 29, 2019, now issued as U.S. Pat. No. 11,501,445 on Nov. 15, 2022, which claims the benefit of U.S. Provisional Patent Application Ser. No. 62/752,756 filed Oct. 30, 2018, and further claims the benefit of U.S. Provisional Patent Application Ser. No. 62/852,963 filed May 24, 2019, all of which are incorporated by reference herein in their entirety. This application is also related to U.S. patent application Ser. No. 16/290,741, filed Mar. 1, 2019, now issued as U.S. Pat. No. 10,369,701, U.S. patent application Ser. No. 16/258,120 filed Jan. 25, 2019, now issued as U.S. Pat. No. 10,456,915, and further related to U.S. patent application Ser. No. 16/539,790 filed Aug. 13, 2019, now issued as U.S. Pat. No. 10,703,584, all three of which are incorporated by reference herein in their entirety.

TECHNICAL FIELD

The present technology is directed generally to robotic systems and, more specifically, to systems, processes, and techniques for scanning and registering objects.

BACKGROUND

Often times, packages are palletized for shipment to a destination where they are de-palletized. While de-palletization may be done by human workers, doing so increases costs and risks bodily injuries. When de-palletization is performed by industrial robots, an imaging device may be employed to capture an image of a stack of packages loaded on the pallet. A system may process the image to ensure the package is efficiently handled by the robotic arm, such as by comparing the captured image with a registered image stored in a registration data source. When the captured image of a package matches a registered image, the system knows physical characteristics (e.g., measurements of a package's dimensions, weight, and/or center or mass) of the imaged objects. However, failure to correctly identify the physical characteristics leads to a variety of unwanted outcomes. For example, such failure could cause a stoppage, which may require manual registration of the package. Also, such failure could result in a package being mishandled, especially if the package is relatively heavy and/or lopsided.

DETAILED DESCRIPTION

Figure 1:
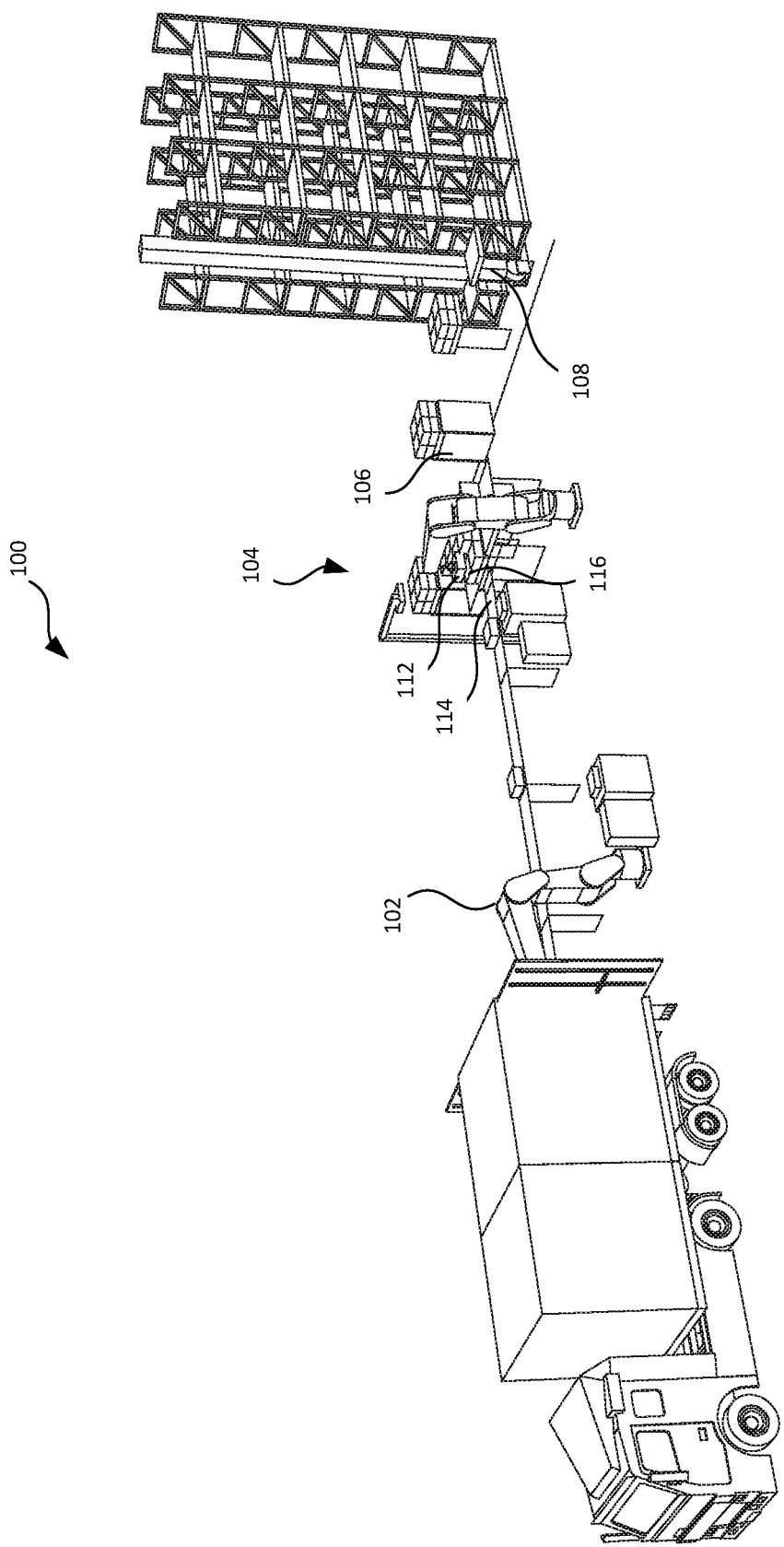
FIG. 1 is an illustration of an example environment in which a robotic system with a package scan-registration mechanism may operate.

Systems and methods for robotic systems with automated package scan and registration mechanisms are described herein. A robotic system (e.g., an integrated system of devices that executes one or more designated tasks) configured in accordance with some embodiments provides enhanced usability and flexibility by autonomously (e.g., automatically with little or no human-operator inputs) scanning and registering previously unknown or unrecognized objects (e.g., packages, boxes, cases, etc.).

To perform various tasks, the robotic system can obtain and compare data regarding objects (e.g., one or more images of exposed surfaces of the objects) at a start location to registration data for known or expected objects. In some instances, the comparison may not result in a match, such as due to the incomplete set of information for the expected objects and/or due to computer-vision related errors. When portions of the compared data fail to match the registration data of known or expected objects, the robotic system can determine object(s) at the corresponding locations as being unrecognized.

Embodiments of the robotic system described herein autonomously identify, manipulate, and register the unrecognized objects. Once the robotic system determines that portions of the sensor output correspond to one or more unrecognized objects, the robotic system can identify exposed edges and/or exposed outer corners of the unrecognized objects that are separate or non-adjacent to other objects. Based on the exposed edges and/or the exposed outer corners, the robotic system can derive minimum viable regions (MVRs) on the exposed surfaces. The MVRs can be associated with areas for contacting and lifting the corresponding objects. Accordingly, the robotic system can grip the unrecognized objects using the MVRs and manipulate them to complete tasks (e.g., to transfer them from one location to another) associated with the unrecognized objects.

While performing the tasks, the robotic system can obtain and utilize further information about the unrecognized objects. For example, the robotic system can obtain additional information such as heights and/or depths of the unrecognized objects during transfer thereof. In completing the tasks, the robotic system can raise or lower the unrecognized objects across crossing references (e.g., sensed lines/planes corresponding to crossing sensors). The crossing references may extend laterally across locations that the transferred objects are required to occupy, such as directly above the starting location and/or directly above the task location. The robotic system can detect sensor events, such as when lowered objects first cross the crossing references and/or when raised objects clear the crossing references. The robotic system can determine vertical positions (e.g., heights) of end-effectors (e.g., grippers) contacting the manipulated objects at the time of the event. Accordingly, the robotic system can determine height of the objects (e.g., object heights) based on comparing the heights of the end-effectors at the time of the event with known vertical positions of the crossing sensors.

Further, the robotic system can autonomously obtain profile/side view images and/or information regarding identifying marks (e.g., bar codes, Quick Response (QR) codes, and/or other mechanisms used to identify the object) for the unknown object. While completing the tasks, the robotic system can place the unrecognized objects at one or more derived locations before scanning sensors (e.g., barcode sensors, Quick Response (QR) code sensors, visual cameras, and/or other identifier sensors) while performing the tasks. The placement locations can be derived based on other obtained characteristics of the unrecognized objects, such as length, width, height/depth measurements also obtained during while performing the tasks. The robotic system can similarly derive scanning maneuvers (e.g., horizontally linear, vertically linear, and/or rotational movements) for presenting multiple surfaces of the unrecognized objects to the scanning imager. The robotic system can also derive timings for operating the scanning sensors according to the scanning maneuvers.

The robotic system can use the newly discovered (e.g., previously uncertain) edges and/or corners, associated measurements (e.g., dimensions of the objects), updated surface images/depth maps, locations and/or values of the identifying marks, or a combination thereof to register the unrecognized objects. In other words, the robotic system can store the new information in the master data to autonomously register ("auto-register") the previously unrecognized objects. Accordingly, the robotic system can use the auto-registration data to identify, process, and/or manipulate subsequent instances of the same type of object.

Further, obtaining and deriving characteristics of the unrecognized object as described below provides the robotic system the ability to process (e.g., transfer, pack, unpack, etc.) even the unrecognized objects without operator assistance. Accordingly, the overall operations of the robotic system can continue uninterrupted even when unrecognized objects are present. Also, the derived scanning positions and the corresponding maneuvers provides increased likelihood of successfully scanning the identifying marks on the unrecognized objects without interrupting the transfer/object manipulation. Thus, the robotic system can scan the object in 3D without deviating from a task-based motion plan.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects introduced here, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a package scan-registration mechanism may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof. Moreover, it is understood that the robotic system 100 can be configured to execute tasks in different sequences, such as for packaging/arranging objects and loading the objects for outbound shipments and/or for processing and storing the objects from an inbound shipment.

Suitable System

Figure 2:
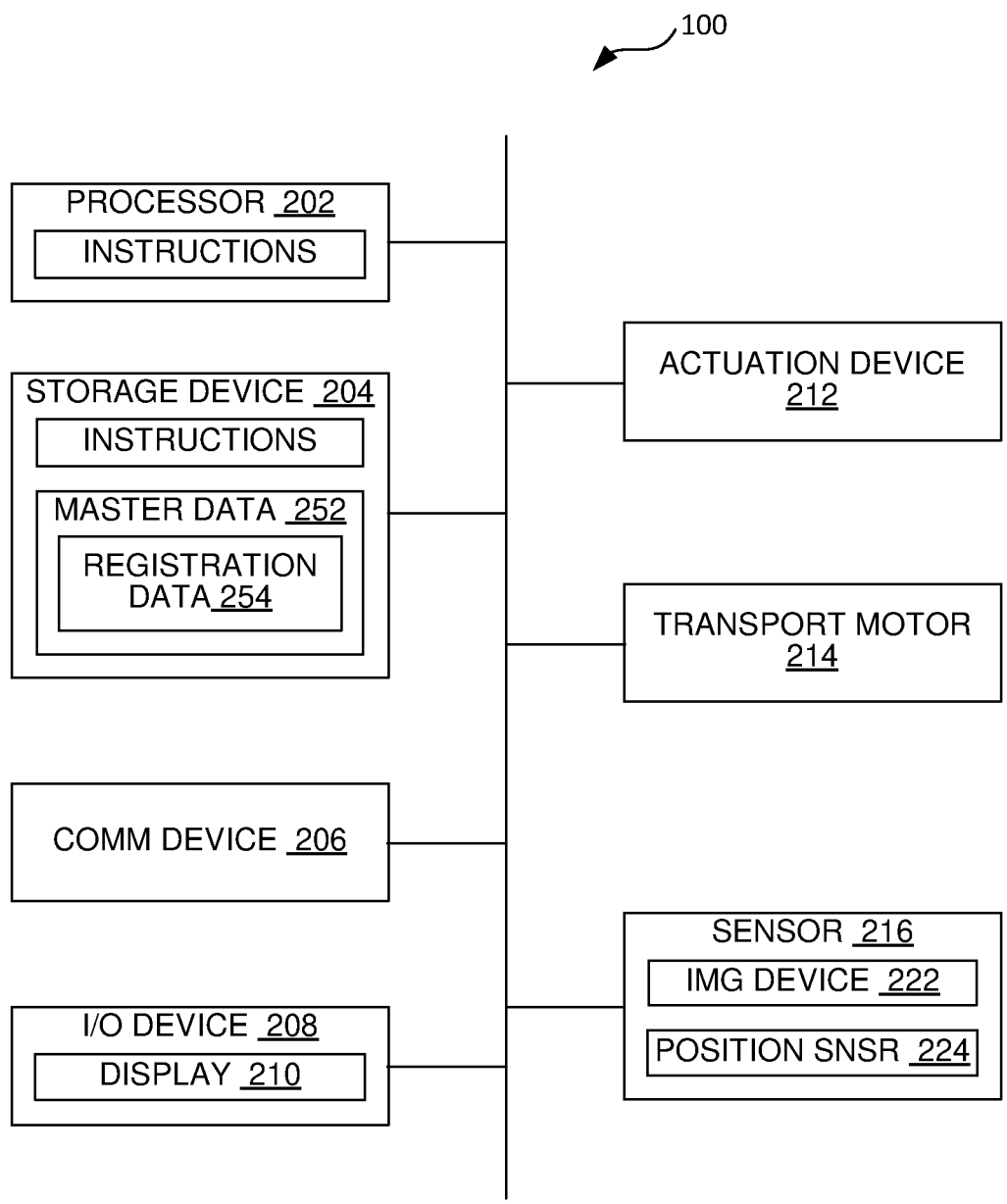
FIG. 2 is a block diagram illustrating the robotic system in accordance with one or more embodiments introduced here.

FIG. 2 is a block diagram illustrating the robotic system 100 in accordance with one or more embodiments introduced here. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include registration data 254 for each such object. The registration data 254 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results. Details regarding the packing algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Object Transfer, Scan, and Registration with a Destination-Based Sensor

Figure 3:
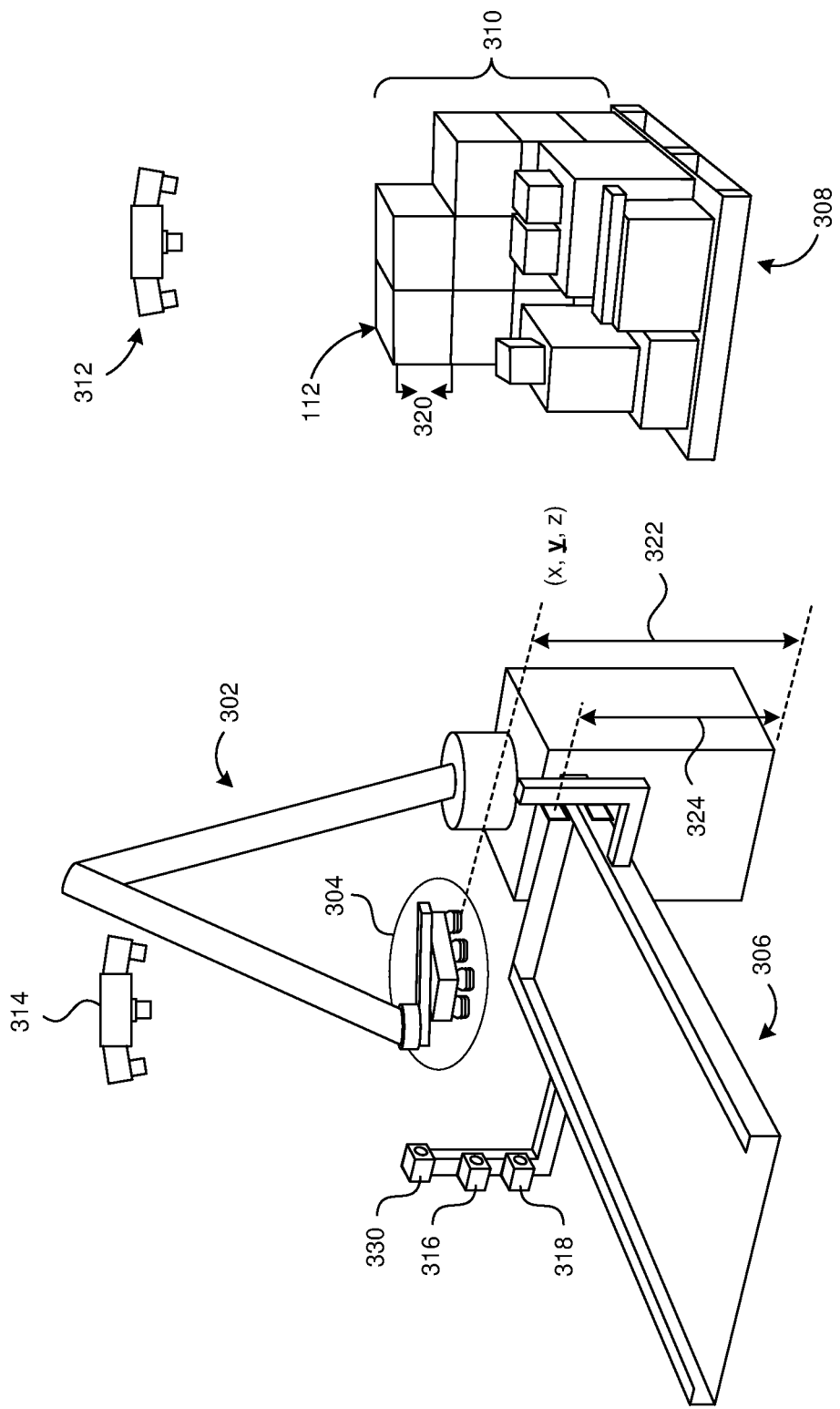
FIG. 3 is an illustration of the robotic system in accordance with one or more embodiments introduced here.

FIG. 3 is an illustration of the robotic system 100 of FIG. 1 in accordance with one or more embodiments introduced here. The robotic system 100 can include a robotic arm 302 (e.g., an instance of the transfer unit 104 of FIG. 1) that includes an end-effector 304 (e.g., a gripper). The robotic arm 302 can be configured to transfer the target object 112 between the start location 114 of FIG. 1 and the task location 116 of FIG. 1. As illustrated in FIG. 3, the start location 114 can have a pallet 308 with a target stack 310 (e.g., a grouping of objects) thereon. The task location 116 for the robotic arm 302 can be a placement location (e.g., a starting/egress point) on a conveyor 306 (e.g., an instance of the transport unit 106 of FIG. 1). For example, the robotic arm 302 can be configured to pick the objects from the target stack 310 and place them on the conveyor 306 for transport to another destination/task.

The robotic system 100 can use one or more of the sensors 216 of FIG. 2 in performing the transfer operation with the robotic arm 302. In some embodiments, the robotic system 100 can include a first imaging sensor 312 and/or a second imaging sensor 314. The first imaging sensor 312 can include one or more 2D and/or 3D sensors, such as cameras and/or depth sensors, configured to image and/or analyze the start location 114. The second imaging sensor 314 can include one or more 2D and/or 3D sensors, such as cameras and/or depth sensors, configured to image and/or analyze the task location 116. For example, the first imaging sensor 312 can include one or more cameras and/or depth sensors located at a known location above and facing the start location 114. The first imaging sensor 312 can generate imaging data corresponding to one or more top views of the start location 114, such as a top view of the target stack 310. Also, the second imaging sensor 314 can include one or more cameras and/or depth sensors located at one or more known locations above and facing the task location 116 or an associated space. Accordingly, the second imaging sensor 314 can generate imaging data corresponding to one or more top views of the target object 112 at or within a threshold distance from the task location 116.

In some embodiments, the robotic system 100 can include one or more crossing sensors (e.g., a destination crossing sensor 316 and/or a release point sensor 318) configured to detect crossing events where an object crosses/leaves corresponding sensing line/plane. For example, the crossing sensors can include line or plane sensors that detect crossing events based on continuity/disruption in transmitted and/or reflected signals (e.g., optical signals, laser, etc.). The crossing sensors, in some embodiments, can transmit optical signals along a sensing line and detect and/or reflect the transmitted signals at an end of the sensing line. Accordingly, the crossing sensors can detect disruptions (e.g., discontinuity) in receiving the transmitted optical signals, which can correspond to an entry event representing an object crossing/entering the sensing line. Similarly, the crossing sensors can re-detect the transmitted signals following a period of disruption, which can correspond to an exit event that represents the object exiting the sensing line. The crossing sensors can generate and/or communicate event data (e.g., flags, state determinations, crossing directions, and/or time stamps) based on detecting the disruptions, redetection of optical signals, and/or a sequence thereof.

In some embodiments, the release point sensor 318 can be used to release the gripped object. The release point sensor 318 can be located above the task location 116 and/or establish the sensing line at a predetermined height. The height of the sensing line/plane (e.g., a release height) can be for safely releasing/dropping objects without damaging the objects. As an example, the height for the sensing line can be 10 cm or less above the placement location on the conveyor 306. Accordingly, the robotic system 100 can use the crossing event detected by the release point sensor 318 as a trigger to release the carried object from of the end-effector 304. In some embodiments, the release height can overlap or be coincident with a sensing line/plane of the destination crossing sensor 316. In other embodiments, the release height can be between vertical locations of the sensing line/plane of the destination crossing sensor 316 and a placement surface of the task location 116 (e.g., the placement surface on the conveyor 306). In other words, the sensing line/plane for the destination crossing sensor 316 can be located above the release height corresponding to the release point sensor 318.

In some embodiments, the destination crossing sensor 316 can be used to measure a height of the target object 112 during transfer. For example, the robotic system 100 can determine a gripper height 322 (e.g., a vertical position/location/coordinate of the end-effector 304 relative to a reference point, such as the ground) at the time of an entry event as detected by the destination crossing sensor 316. The robotic system 100 can compare the gripper height 322 to a crossing reference height 324 (e.g., a known vertical position of the destination crossing sensor 316 and/or a reference line/plane thereof) to calculate an object height 320 of the target object 112 that is being transferred. In other words, the destination crossing sensor 316 can act as a trigger that indicates a time when a bottom portion of the target object 112 crosses the sensing line. Accordingly, the robotic system 100 can use the gripper height 322 at such time and the known height of the sensing line to calculate the object height 320 for the target object 112.

In some embodiments, the robotic system 100 can include one or more scanning sensors 330 configured to scan the object during transfer. Some examples of the scanning sensors 330 can include barcode scanners, QR code scanners, imaging (2D) cameras, radio-frequency identification (RFID) scanner, and/or other types of identification scanning devices. The scanning sensors 330 may be positioned to scan locations that the transferred objects are required to occupy, such as spaces directly above the starting location 114 and/or directly above the task location 116. Further, the scanning sensor 330 can be positioned at a known location relative to the destination crossing sensor 316 and/or other reference locations (e.g., ground).

Based on the relative locations/arrangements of the destination crossing sensor 316 and the scanning sensor 330, the robotic system 100 can operate the scanning sensor 330 according to information from or associated with the destination crossing sensor 316. For the example illustrated in FIG. 3, the scanning sensor 330 can be located above the destination crossing sensor 316 at a known height and be positioned to scan a region above the task location 116. In some embodiments, a status of the destination crossing sensor 316 (e.g., a crossing/exit event) can trigger one or more instances of the scanning sensor 330 (e.g., horizontally facing cameras directed at a space above the task location 116) to scan and collect data. In other embodiments, the robotic system 100 can derive a scanning position and/or a scanning maneuver based on the calculated object height 320 or a processing result thereof. Accordingly, the robotic system 100 can obtain data regarding the object from different points of view (e.g., side or profile views/images, shape measurements along a different dimension, etc.) and/or scan the identification information while performing the task.

For illustrative purposes, the destination crossing sensor 316 and the scanning sensor 330 are shown attached to the conveyor 306. However, it is understood that the destination crossing sensor 316 and the scanning sensor 330 can be configured differently. For example, the destination crossing sensor 316 and the scanning sensor 330 can be disconnected and/or independent from any apparatus at the task location 116. Also, it is understood that the scanning sensor 330 can include a set of scanners arranged at different positions and orientations to simultaneously/sequentially scan multiple surfaces of the object.

The destination crossing sensor 316 and the scanning sensor 330 (e.g., horizontally facing cameras or ID scanners) can obtain additional data for the unrecognized objects during transfer. As described above, the destination crossing sensor 316 can be used to calculate the object height 320 of the transferred object without any additional maneuvers/movements in transferring the object. Further, determining the object height 320 after lifting the object provides increased accuracy in the height measurements since some objects may deform when they are resting on top of another object. In other words, shapes and any corresponding dimensions of the objects may change when the objects are lifted/suspended. For example, when suspended, the object profiles and/or the corresponding heights (e.g., distances from the end-effector 304 to bottom portions of the objects) may change due to a lack of rigidity in the package, such as for cloth-based or rubber-based items that are wrapped in plastic wrappings. By using a crossing sensor (e.g., the destination crossing sensor 316) to determine the object height 320 during transfer, the robotic system 100 can accurately account (via, e.g., motion planning) for any changes in shapes/dimensions of the objects during transfer. Thus, the robotic system 100 can use the actual object height (e.g., height of the object when suspended instead of the resting height) in transferring the objects, thereby reducing/eliminating any collisions that may have occurred due to the changes in the shapes. In some embodiments, the robotic system 100 can adjust transport speed, transport acceleration, or a combination thereof according to the actual object height, such as to reduce swaying or pendulating motion of the transferred object. In some embodiments, the robotic system 100 can use the resting object height and/or the transfer object height to register the unrecognized objects.

Further, the robotic system 100 can manipulate the object and operate the scanning sensor 330 according to the calculated object height 320 to provide accurate identification information (e.g., 2D/3D images of one or more vertically-oriented surfaces/edges, profile shapes, identifier values, and/or identifier locations) about the unrecognized object that may not be detectable by the first imaging sensor 312 and/or the second imaging sensor 314. As described in detail below, the object height and/or the additional information can be used to generate the registration data 254 of FIG. 2 for unrecognized objects. Accordingly, the robotic system 100 can obtain more information about unrecognized objects, which can be used to increase likelihood of subsequent recognitions of other like objects and/or to increase accuracy in further manipulating the object, without disturbing the transfer task.

In some embodiments, the robotic system 100 can use the object height and/or the additional information to re-analyze and recognize the object, such as by analyzing other surfaces (e.g., vertically-oriented surfaces/dimensions) of the object in addition to the top surface. Accordingly, the robotic system 100 can reduce the number of unrecognized boxes or false negative results.

Figure 4A:
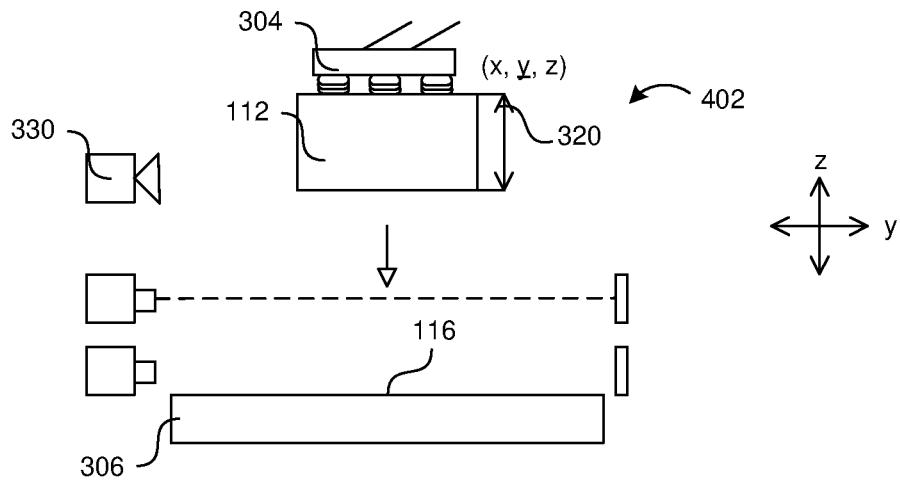
FIGS. 4A-4D illustrate a scanning sequence in accordance with one or more embodiments introduced here.

Object Height Calculation and Scanning Sequence for the Destination-Based Sensor FIGS. 4A-4D illustrate a sequence (e.g., various example processing states) for height calculation and object scanning in accordance with one or more embodiments introduced here. FIG. 4A illustrates a height-unknown state 402. For the height-unknown state 402, the robotic system 100 of FIG. 1 can operate or execute instructions for operating the robotic arm 302 of FIG. 3 to place the end-effector 304 and the target object 112 horizontally overlapping and above the task location 116. The height-unknown state 402 can precede calculation of the object height 320. Accordingly, the robotic system 100 can lower the target object 112 toward the task location 116 (i.e. the conveyor 306). During the height-unknown state 402, the robotic system 100 may place the target object 112 outside of (e.g., above and/or below) a scanning zone associated with the scanning sensor 330. Accordingly, the scanning sensor 330 may remain inactive.

Figure 4B:
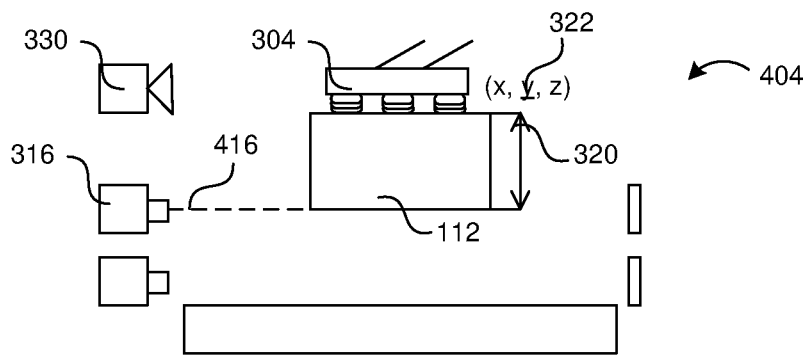

FIG. 4B illustrates a height-calculation state 404 that corresponds to a bottom portion of the target object 112 entering or crossing a sense line 416 (e.g., a line traversed by the laser/optical signal sent/sensed by the destination crossing sensor 316). As described above, the robotic system 100 can obtain the gripper height 322 at the time of the crossing event. Using the gripper height 322 and the crossing reference height 324 of FIG. 3 (e.g., the height of the sense line 416), the robotic system 100 can calculate the object height 320 (e.g., as a difference between the two parameters). During the height-calculation state 404, the robotic system 100 may place the target object 112 outside of (e.g., above and/or below) a scanning zone associated with the scanning sensor 330. Accordingly, the scanning sensor 330 may remain inactive.

Figure 4C:
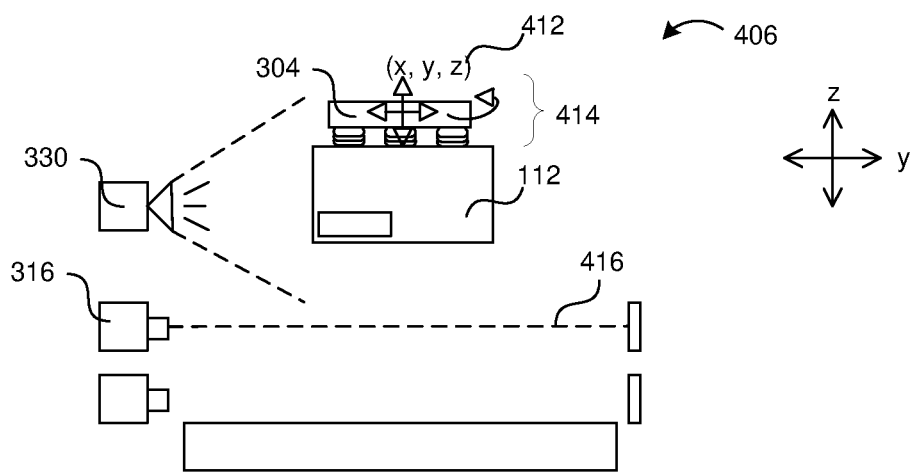

FIG. 4C illustrates a scanning state 406. Based on the calculated object height 320, the robotic system 100 can derive one or more scanning positions 412 and/or a scanning maneuver 414. The scanning positions 412 can include locations and/or orientations (e.g., poses) for placing the end effector 304 to present and scan one or more surfaces (e.g., the peripheral/vertically oriented surfaces) or a portion thereof of the target object 112 with the scanning sensor 330. In other words, the scanning positions 412 can be for placing the target object 112 within a scanning zone (e.g., in front and/or within a predetermined distance) of the scanning sensor 330. The scanning maneuver 414 can include a sequence of commands and/or settings (e.g., a motion plan) configured to move the end effector 304 across space for scanning unrecognized object. In other words, the scanning maneuver 414 can correspond to vertical displacements (e.g., along a z-axis), horizontal displacements (e.g., along an x-axis and/or a y-axis), and/or rotations (e.g., rotations about the z-axis) of the unrecognized object for scanning multiple portions of a surface and/or multiple surfaces thereof.

As an illustrative example, objects may typically include barcodes and/or QR codes on corner and/or end portions of one or more object surfaces. To scan the barcodes and/or the QR codes, the robotic system 100 can use the calculated object height 320 to locate the corner and/or the end portions of the target object 112 (e.g., the unrecognized object). Thus, based on the object height 320, the robotic system 100 can provide increased likelihood of accurately locating the barcodes, the QR codes, and/or other identifiers on the unrecognized objects.

The robotic system 100 can use the estimates of the corner and/or the end portion locations to derive the scanning position 412. The robotic system 100 can operate the robotic arm 302 of FIG. 3 and/or the end effector 304 according to the scanning position 412, thereby placing one of the more surfaces of the target object 112 scanning zones of the scanning sensor 330. For example, the robotic system 100 can raise the target object 112 after the bottom portion thereof crosses the sensing line 416 such that a bottom or a top portion of the vertically-oriented surface is within the scanning zone. Also, the robotic system 100 can lower the target object 112 such that a top portion of the vertically-oriented surface is within the scanning zone. The robotic system 100 may also raise/lower the target object 112 to vertically center target object 112 within the scanning zone.

The robotic system 100 can further derive the scanning maneuver 414 based on the estimates of the corner and/or the end portion locations. For example, the robotic system 100 can derive the scanning maneuver 414 for horizontally/vertically displacing the target object 112 to present multiple corners and/or end portions thereof to the scanning sensor 330. Also, the robotic system 100 can derive the scanning maneuver 404 for rotating the target object 112 to present multiple surfaces thereof to the scanning sensor 330.

The robotic system 100 can operate the scanning sensor 330 based on placing the end effector 304 at the scanning position 412 and/or based on implementing the scanning maneuver 414. For example, the robotic system 100 can trigger the scanning sensor 330 after placing the end effector 304 at the scanning position 412 and/or at predetermined timings while implementing scanning maneuver 414. Also, the robotic system 100 can implement the scanning maneuver 414 while the scanning sensor 330 remains activated. Thus, based on the scanning position 412 and/or the scanning maneuver 414, the robotic system 100 can present multiple surfaces/portions of the unrecognized objects and increase the likelihood of accurately locating and scanning identifiers on the unrecognized objects.

In alternative embodiments, the robotic system 100 can move the scanning sensor 330 (via, e.g., a robotic arm) to scan the target object 112. Accordingly, the robotic system 100 can derive the scanning position 412 and/or the scanning maneuver 414 for displacing or repositioning the scanning sensor 330 instead of the target object 112. Thus, the robotic system 100 can minimize movement of the target object 112 while scanning, thereby reducing/removing likelihood of object loss (e.g. due to failed grip or collision) during scanning.

Figure 4D:
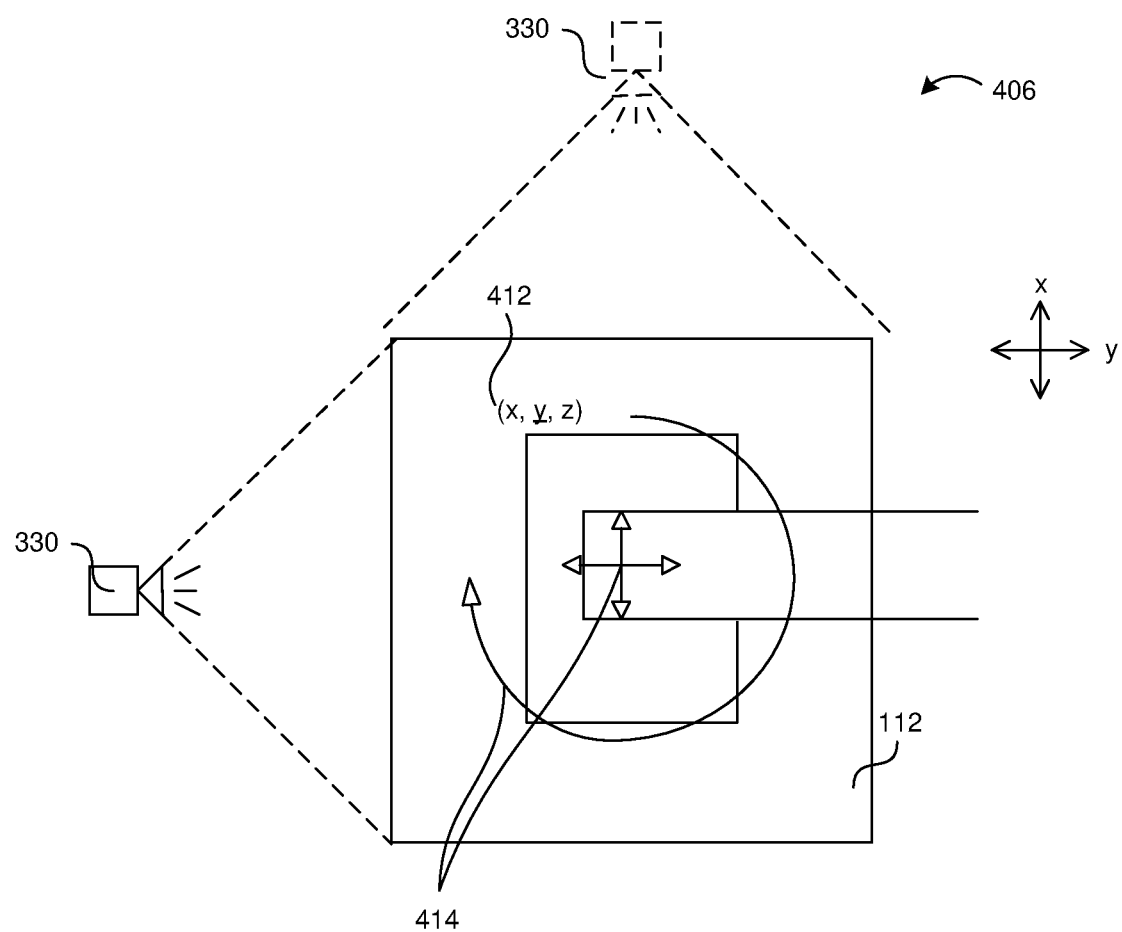

FIG. 4D further illustrates the scanning state 406. More specifically, FIG. 4D illustrates the target object 112 from a top-down view. In some embodiments, the robotic system 100 can derive the scanning position 412 and/or the scanning maneuver 414 according to multiple scanning sensors 330 and the corresponding scanning zones. Also, as an illustrative example, the robotic system 100 can derive scanning maneuver 414 for moving the recognized object along the x-axis and/or the y-axis and/or for rotating the object about the z-axis.

Object Transfer, Scan, and Registration with a Source-Based Sensor

Figure 5:
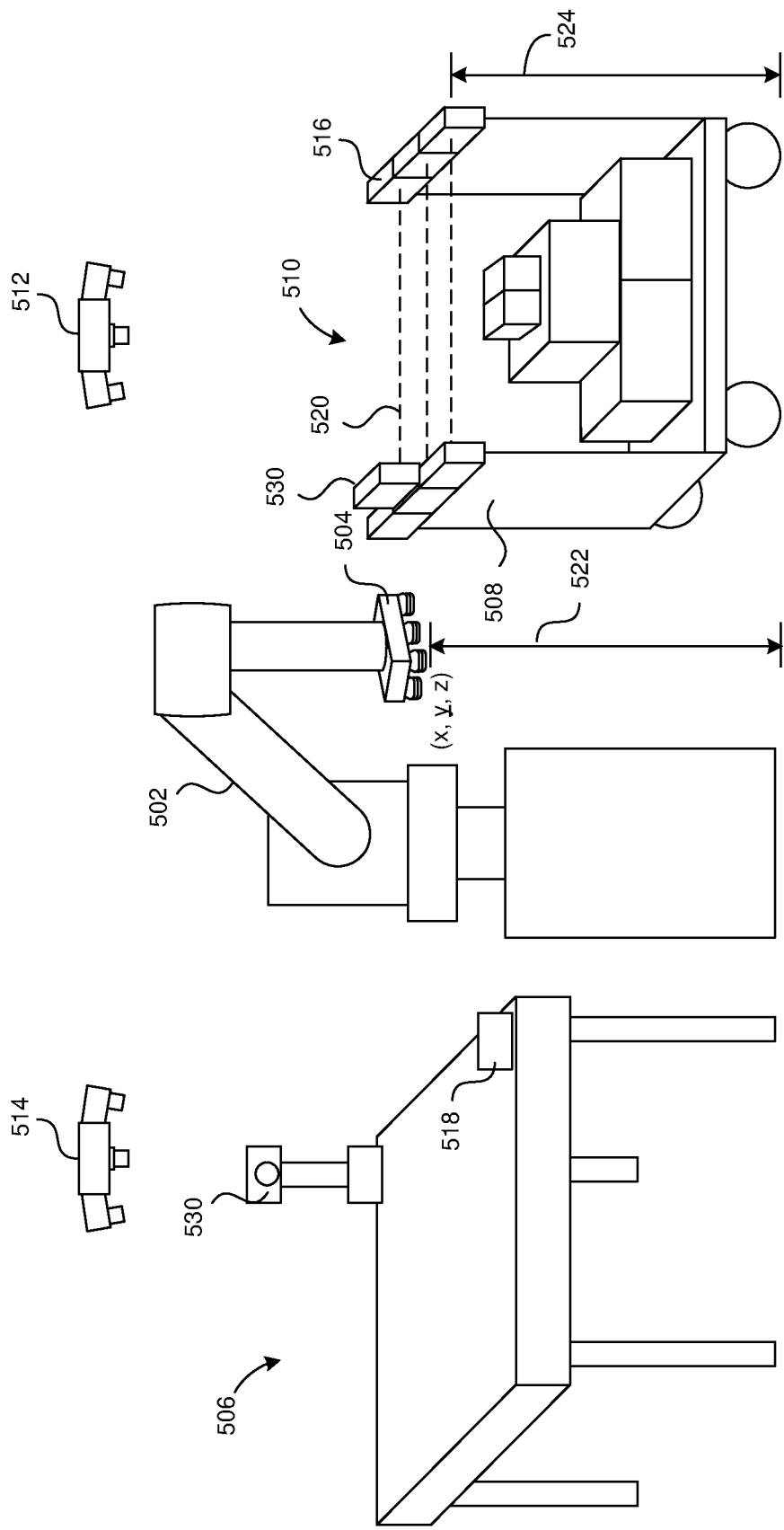
FIG. 5 is an illustration of the robotic system in accordance with one or more embodiments introduced here.

FIG. 5 is an illustration of the robotic system 100 of FIG. 1 in accordance with one or more embodiments introduced here. Aspects of the robotic system 100 illustrated in FIG. 5 can be similar to those illustrated in FIG. 3, but with one or more sensors located at different locations.

The robotic system 100 can include a robotic arm 502 (e.g., an instance of the transfer unit 104 of FIG. 1) that includes an end-effector 504 (e.g., a gripper). The robotic arm 502 can be configured to transfer the target object 112 of FIG. 1 between the start location 114 of FIG. 1 and the task location 116 of FIG. 1. In some embodiments, the start location 114 can correspond to a container 508 (e.g., a walled-cart) with a target stack 510 (e.g., a grouping of objects that can include the target object 112) thereon. The task location 116 for the robotic arm 502 can be a placement location (e.g., a starting/egress point) on a conveyor 506 (e.g., an instance of the transport unit 106 of FIG. 1). For example, the robotic arm 502 can be configured to pick the objects from the target stack 510 and place them on the conveyor 506 for transport to another destination/task.

The robotic system 100 can use one or more of the sensors 216 of FIG. 2 in performing the transfer operation with the robotic arm 502. In some embodiments, the robotic system 100 can include a first imaging sensor 512 and/or a second imaging sensor 514. The first imaging sensor 512 can include one or more 2D and/or 3D sensors, such as cameras and/or depth sensors, configured to image and/or analyze the start location 114. The second imaging sensor 514 can include one or more 2D and/or 3D sensors, such as cameras and/or depth sensors, configured to image and/or analyze the task location 116. For example, the first imaging sensor 512 can include one or more cameras and/or depth sensors located at a known location above and facing the start location 114. The first imaging sensor 512 can generate imaging data corresponding to one or more top views of the start location 114, such as a top view of the target stack 510. Also, the second imaging sensor 514 can include one or more cameras and/or depth sensors located at one or more known locations above and facing the task location 116. Accordingly, the second imaging sensor 514 can generate imaging data corresponding to one or more top views of the target object 112 that are at or within a threshold distance from the task location 116.

In some embodiments, the robotic system 100 can include one or more crossing sensors (e.g., a source crossing sensor 516 and/or a release point sensor 518) configured to detect crossing events where an object crosses/leaves corresponding sensing line/plane (e.g., a crossing reference 520). For example, crossing sensors can correspond to line or plane sensors that detect crossing events based on continuity/disruption in transmitted and/or reflected signals (e.g., optical signals, laser, etc.). The crossing sensors, in some embodiments, can transmit optical signals along a sensing line and detect and/or reflect the transmitted signals at an end of the sensing line, thereby establishing the crossing references 520. Accordingly, the crossing sensors can detect disruptions (e.g., discontinuity) in receiving the transmitted optical signals, which can correspond to an entry event representing an object crossing/entering the crossing references 520. Similarly, the crossing sensors can re-detect the transmitted signals following a period of disruption, which can correspond to an exit event that represents the object exiting the crossing references 520.

In some embodiments, the release point sensor 518 can be used to release the gripped object. The release point sensor 518 can be located above the task location 116 and/or establish the sensing line at a predetermined height. The height of the sensing line can be for safely dropping objects without damaging the objects. As an example, the height for the sensing line can be 10 cm or less above the placement location on the conveyor 506. Accordingly, the robotic system 100 can use the crossing event detected by the release point sensor 518 as a trigger to release the carried object from of the end-effector 304.

In some embodiments, the source crossing sensor 516 can be used to measure an object height of the target object 112 during transfer. For example, the robotic system 100 can determine a gripper height 522 (e.g., a vertical position/location of the end-effector 504 relative to a reference point, such as the ground) at the time of a crossing event (e.g., an exit event) as detected by the source crossing sensor 516. The robotic system 100 can compare the gripper height 522 to a crossing reference height 524 (e.g., a known vertical position of the source crossing sensor 516 and/or the crossing reference 520) to calculate the object height of the target object 112 that is being transferred. In other words, the source crossing sensor 516 can act as a trigger that indicates a time when a bottom portion of the target object 112 exits the sensing line. Accordingly, the robotic system 100 can use the gripper height 522 at such time and the known height of the crossing reference 520 to calculate the object height of the target object 112.

In some embodiments, the robotic system 100 can include one or more scanning sensors 530 configured to scan the object during transfer. Some examples of the scanning sensors 530 can include barcode scanners, QR code scanners, imaging (2D) cameras, radio-frequency identification (RFID) scanner, and/or other types of identification scanning devices. The scanning sensors 530 may be positioned to scan locations that the transferred objects are required to occupy, such as spaces directly above/adjacent to the starting location 114 and/or the task location 116. Further, the scanning sensor 530 can be positioned at a known location relative to the destination crossing sensor 316 of FIG. 3, the source crossing sensor 516, and/or other reference locations (e.g., ground).

Based on the relative locations/arrangements of the source crossing sensor 516 and the scanning sensor 530, the robotic system 100 can operate the scanning sensor 530 according to information from or associated with the source crossing sensor 516 For the example illustrated in FIG. 5, the scanning sensor 530 can be located above the source crossing sensor 516 at a known height and be positioned to scan a region above the starting location 114 In some embodiments, a status of the source crossing sensor 516 (e.g., a crossing/exit event) can trigger one or more instances of the scanning sensor 530 (e.g., horizontally facing cameras directed at a space above the starting location 114) to scan and collect data. In other embodiments, the robotic system 100 can derive a scanning position and/or a scanning maneuver based on a calculated object height or one or more processing results thereof. Accordingly, the robotic system 100 can obtain data regarding the object from different points of view (e.g., side or profile views/images, bottom views/images, shape measurements along a different dimension, etc.) and/or scan the identification information while performing the task.

For illustrative purposes, the source crossing sensor 516 and the scanning sensor 530 are shown attached to the container 508. However, it is understood that the source crossing sensor 516 and the scanning sensor 530 can be configured differently. For example, the source crossing sensor 516 and the scanning sensor 530 can be disconnected and/or independent from any apparatus at the start location 114. Also, it is understood that the scanning sensor 530 can include a set of scanners arranged at different positions and orientations to simultaneously/sequentially scan multiple surfaces of the object.

The source crossing sensor 516 and the scanning sensor 530 (e.g., horizontally and/or upwardly facing cameras or ID scanners) can obtain additional data for the unrecognized objects during transfer. As described above, the source crossing sensor 516 can be used to calculate the object height of the transferred object without any additional maneuvers/movements in transferring the object. Further, determining the object height after lifting the object provides increased accuracy in the height measurements since some objects may deform when they are resting on top of another object. In other words, shapes and any corresponding dimensions of the objects may change when the objects are lifted/suspended. For example, when suspended, the object profiles and/or the corresponding heights (e.g., distances from the end-effector 504 to bottom portions of the objects) may change due to a lack of rigidity in the package, such as for cloth-based or rubber-based items that are wrapped in plastic wrappings. By using a crossing sensor (e.g., the source crossing sensor 516) to determine the object height during transfer, the robotic system 100 can accurately account (via, e.g., motion planning) for any changes in shapes/dimensions of the objects during transfer. Thus, the robotic system 100 can use the actual object height (e.g., height of the object when suspended instead of the resting height) in transferring the objects, thereby reducing/eliminating any collisions that may have occurred due to the changes in the shapes. In some embodiments, the robotic system 100 can adjust transport speed, transport acceleration, or a combination thereof according to the actual object height, such as to reduce swaying or pendulating motion of the transferred object. In some embodiments, the robotic system 100 can use the resting object height and/or the transfer object height to register the unrecognized objects.

Further, the robotic system 100 can manipulate the object and operate the scanning sensor 530 according to the calculated object height to provide accurate identification information (e.g., 2D/3D images of one or more vertical and/or bottom surfaces/edges, profile shapes, identifier values, and/or identifier locations) about the unrecognized object that may not be detectable by the first imaging sensor 512 and/or the second imaging sensor 514. As described in detail below, the object height and/or the additional information can be used to generate the registration data 254 of FIG. 2 for unrecognized objects. Accordingly, the robotic system 100 can obtain more information about unrecognized objects, which can be used to increase likelihood of subsequent recognitions of other like objects and/or to increase accuracy in further manipulating the object, without disturbing the transfer task.

In some embodiments, the robotic system 100 can use the object height and/or the additional information to re-analyze and recognize the object, such as by analyzing other surfaces (e.g., vertically-oriented surfaces/dimensions) of the object (e.g., in addition to the top surface. Accordingly, the robotic system 100 can reduce the number of unrecognized boxes or false negative results.

Object Height Calculation and Scanning Sequence for the Source-Based Sensor

FIGS. 6A-6D illustrate a sequence (e.g., various example processing states) for height calculation and object scanning in accordance with one or more embodiments introduced here. The robotic system 100 of FIG. 1 can operate/execute instructions for operation of the source crossing sensor 516 according to a location/height of the end-effector 504 and/or the target object 112 of FIG. 1.

Figure 6A:
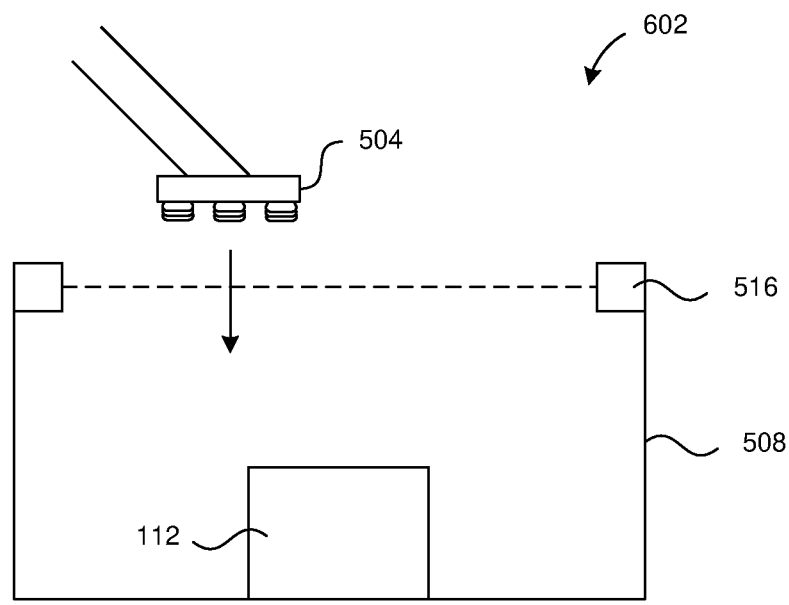
FIGS. 6A-6F illustrate a scanning sequence in accordance with one or more embodiments introduced here.

FIG. 6A represents an initial state 602 corresponding to the robotic arm 502 of FIG. 5 and/or the end-effector 504 located above and/or outside the container 508. The initial state 602 can correspond to the robotic arm 502 beginning to reach into the container 508 to grip and pick up the target object 112. Accordingly, the robotic system 100 can turn off and/or ignore the outputs from the source crossing sensor 516 and/or the scanning sensor 530 of FIG. 5 during the initial state 602.

Figure 6B:
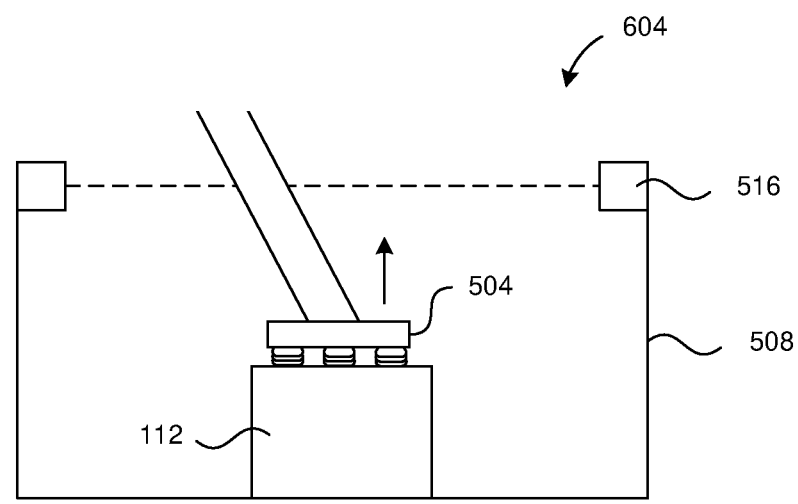

FIG. 6B represents an approach state 604 corresponding to the robotic arm 502 crossing into and below a top portion of the container 508, contacting and gripping the target object 112, and/or initially lifting the target object 112. For example, the approach state 604 can represent the end-effector 504 being over the target object 112 (e.g., within a boundary associated with the start location 114 of FIG. 1) and/or below the crossing reference height 524 of FIG. 5. The robotic system 100 can keep the scanning sensor 530 off or ignore outputs thereof during the approach state 604.

Figure 6C:
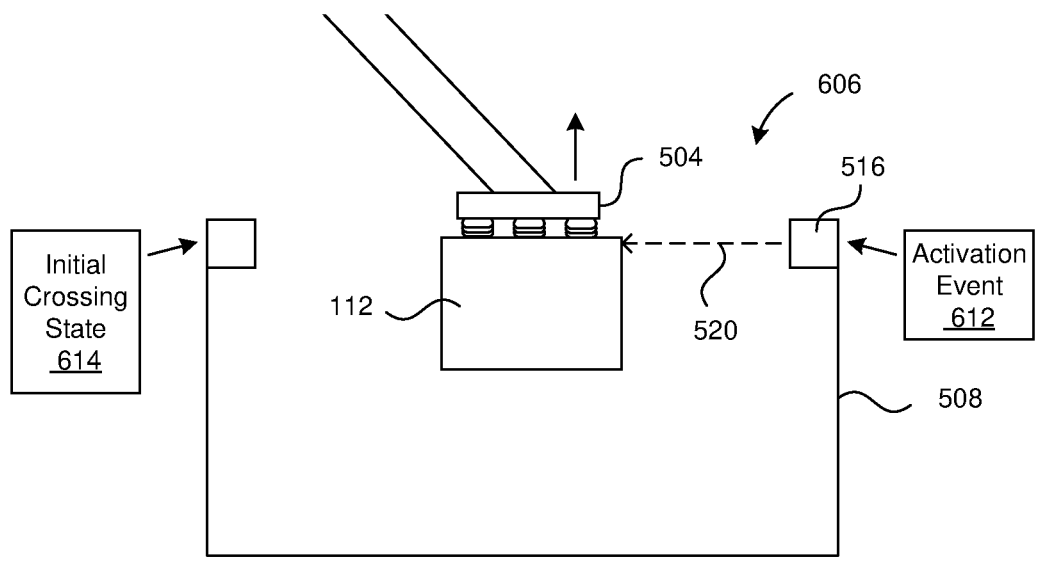

FIG. 6C represents a crossing state 606 corresponding to the target object 112 crossing or entering the crossing reference 520. The robotic system 100 can track the gripper location (e.g., a set of coordinate values, such as x-y-z values illustrated in FIG. 5), including the gripper height 522 of FIG. 5, while operating the robotic arm 502. When the gripper height 522 exceeds the crossing reference height 524 of FIG. 5, the robotic system 100 can generate an activation event 612 to turn the source crossing sensor 516 on. The output from the source crossing sensor 516 can correspond to an initial crossing state 614 with the target object 112 crossing or entering the crossing reference 520.

In some embodiments, the robotic system 100 can generate the activation event 612 and/or determine the initial crossing state 614 following the initial state 602 (e.g., during the approach state 604) since the robotic arm 502 is across the crossing reference 520. In other words, the robotic system 100 can generate the activation event 612 and/or determine the initial crossing state 614 when the end-effector 504 is over (e.g., horizontally overlapping) the container 508 and when the gripper height 522 is less than the crossing reference height 524. In some embodiments, the robotic system 100 may keep the scanning sensor 530 off or ignore outputs thereof during the crossing state 606. In other embodiments, the robotic system 100 may trigger or activate the scanning sensor 530 based on the gripper height 522 during the crossing state 606.

Figure 6D:
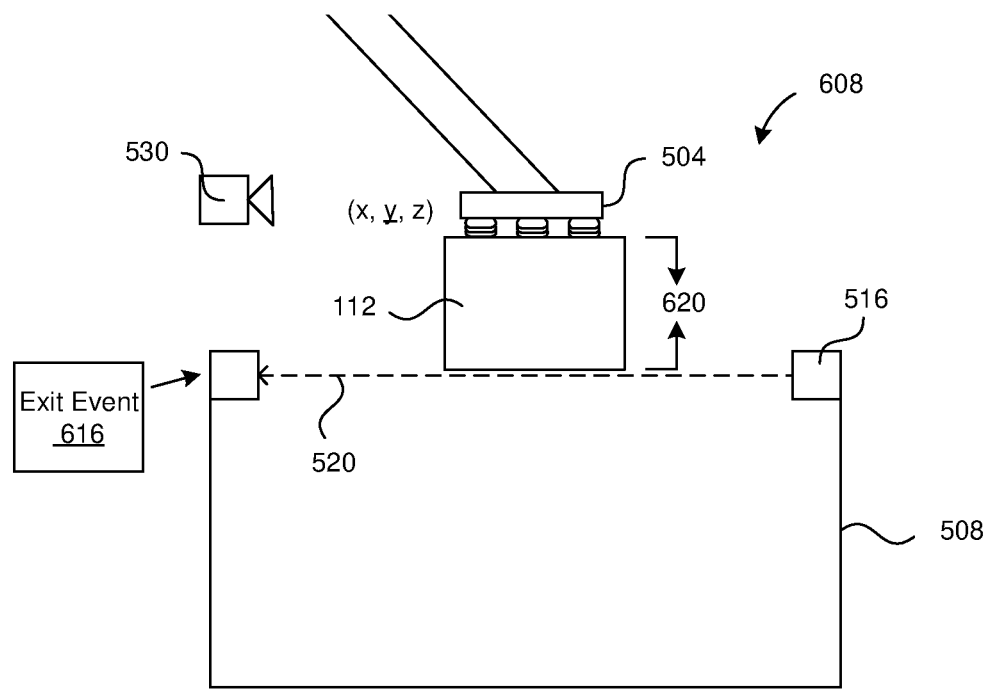

FIG. 6D represents a clearing state 608 corresponding to the target object 112 exiting or clearing the crossing reference 520. The clearing state 608 can correspond to an exit event 616 detected by the source crossing sensor 516. For example, the transmitted light/laser signal can be detected by the source crossing sensor 516 when the bottom portion of the target object 112 is above the crossing reference 520.

The robotic system 100 can use the exit event 616 or a timing thereof (i.e. a timestamp corresponding to the exit event 616) to calculate an object height 620 of the target object 112. The processing for calculating the object height 620 using the information from the source crossing sensor 516 can be similar to that of the height calculation using information from destination crossing sensors (e.g., the destination crossing sensor 316 of FIG. 3). For example, the robotic system 100 can determine the gripper height 522 at the time of the exit event 616. The robotic system 100 can calculate the object height 620 based on a difference between the gripper height 522 and the crossing reference height 524 (e.g., a known/predetermined value) at the time of the exit event 616. In some embodiments, the robotic system 100 may keep the scanning sensor 530 off or ignore outputs thereof during the approach state 604. In other embodiments, the robotic system 100 can activate or trigger the scanning sensor 530 based on the exit event 616 and/or the gripper height 522.

Figure 6E:
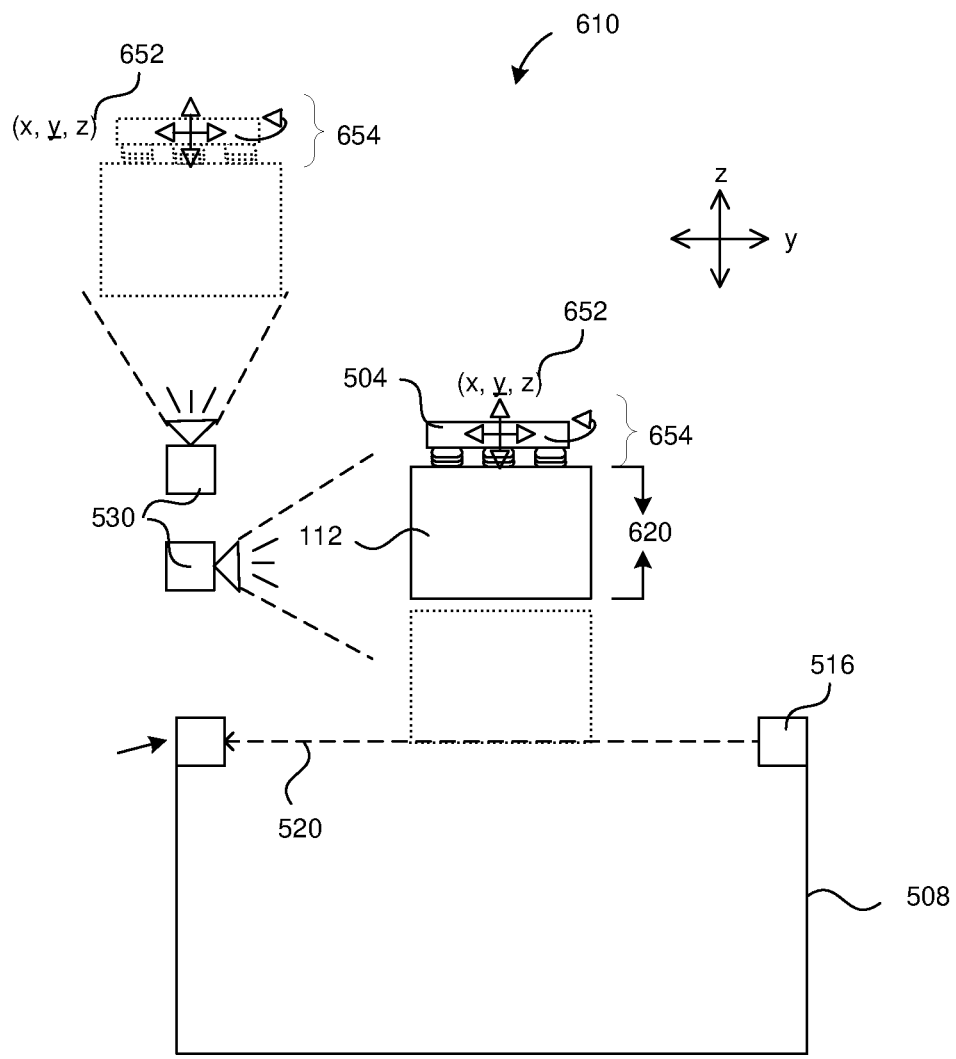

FIG. 6E represents a clearing state 610 corresponding to the target object 112 exiting or clearing the crossing reference 520. Based on the calculated object height 620, the robotic system 100 can derive one or more scanning positions 652 and/or a scanning maneuver 654. The scanning positions 652 can include locations for placing the end effector 504 to present and scan one or more surfaces (e.g., the peripheral/vertically oriented surfaces and/or a bottom surface) or a portion thereof of the target object 112 with the scanning sensor 530. In other words, the scanning positions 652 can be for placing the target object 112 within a scanning zone (e.g., in front and/or within a predetermined distance) of the scanning sensors 530. The scanning maneuver 654 can include a sequence of commands and/or settings (e.g., a motion plan) configured to move the end effector 504 across space for scanning the unrecognized object. In other words, the scanning maneuver 654 can correspond to vertical displacements (e.g., along a z-axis), horizontal displacements (e.g., along an x-axis and/or a y-axis), and/or rotations (e.g., rotations about the z-axis) of the unrecognized object for scanning multiple portions of a surface and/or multiple surfaces thereof.

As an illustrative example, objects may typically include barcodes and/or QR codes on corner and/or end portions of one or more object surfaces. To scan the barcodes and/or the QR codes, the robotic system 100 can use the object height 620 to locate a bottom surface of the target object 112. The robotic system 100 can use the calculated object height 620 and/or the horizontal dimensions to further locate the corner and/or the end portions of one or more surfaces of the target object 112 (e.g., the unrecognized object). Thus, based on the object height 620, the robotic system 100 can provide increased likelihood of accurately locating the barcodes, the QR codes, and/or other identifiers on the unrecognized objects.

The robotic system 100 can use the estimated locations of the corner and/or the end portion locations to derive the scanning positions 652. The robotic system 100 can operate robotic arm 502 and/or the end effector 504 according to the scanning position 562, thereby placing one of the more surfaces of the target object 112 in the scanning zones of the scanning sensor 530. For example, the robotic system 100 can raise the target object 112 after the bottom portion thereof exits the reference plane 620 such that a bottom or a top portion of the vertically-oriented surface or a bottom surface is within the scanning zone. Also, the robotic system 100 can lower the target object 112 such that a top portion of the vertically-oriented surface is within the scanning zone. The robotic system 100 may also raise/lower the target object 112 to vertically center target object 112 within the scanning zone.

The robotic system 100 can further derive the scanning maneuver 654 based on the location estimates of the corner and/or the end portion locations. For example, the robotic system 100 can derive the scanning maneuver 654 for horizontally/vertically displacing the target object 112 to present multiple corners, end portions, and/or surfaces thereof to the scanning sensors 530. Also, the robotic system 100 can derive the scanning maneuver 654 for rotating the target object 112 to present multiple surfaces thereof to the scanning sensors 530.

The robotic system 100 can operate/execute instructions for operating the scanning sensor 530 based on placing the end effector 504 at the scanning positions 652 and/or based on implementing the scanning maneuver 654. For example, the robotic system 100 can trigger the scanning sensors 530 after placing the end effector 504 at the scanning positions 652 and/or at predetermined timings while implementing the scanning maneuver 654. Also, the robotic system 100 can implement the scanning maneuver 654 while the scanning sensor 530 remains activated. Thus, based on the scanning position 652 and/or the scanning maneuver 654, the robotic system 100 can present multiple surfaces/portions of the unrecognized objects and increase the likelihood of accurately locating and scanning identifiers on the unrecognized objects.

In alternative embodiments, the robotic system 100 can move the scanning sensor 530 (via, e.g., a robotic arm) to scan the target object 112. Accordingly, the robotic system 100 can derive the scanning positions 652 and/or the scanning maneuver 654 for displacing or repositioning the scanning sensor 530 instead of the target object 112. Thus, the robotic system 100 can minimize movement of the target object 112 while scanning, thereby reducing/removing likelihood of object loss (e.g. due to failed grip or collision) during scanning.

Figure 6F:
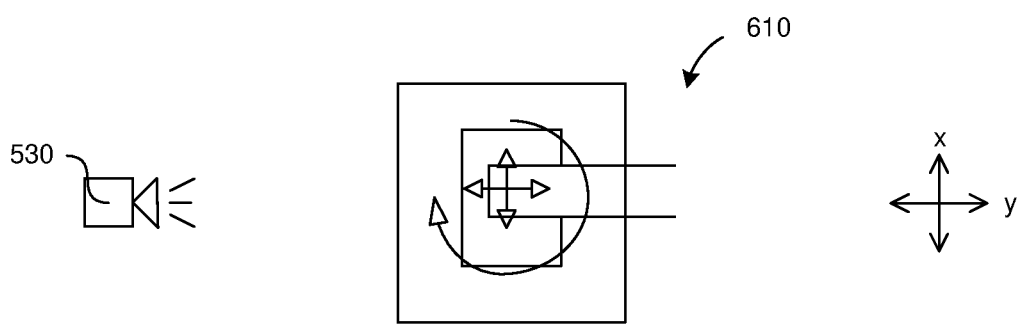

FIG. 6F further illustrates the scanning state 610. In some embodiments, the robotic system 100 can derive the scanning position 652 of FIG. 6E and/or the scanning maneuver 654 of FIG. 6E according to the one or more scanning sensors 530 and the corresponding scanning zones. Also, as an illustrative example, the robotic system 100 can derive the scanning maneuver 654 for moving the unrecognized object along the x-axis and/or the y-axis and/or for rotating the unrecognized object about the z-axis (also referred to as the vertical axis).

For illustrative purposes, the scanning sequences have been described relative to specific arrangements between the crossing sensors and the scanning sensors. However, it is understood that the scanning sequences can be applied differently across different embodiments. For example, the robotic system 100 can use the source crossing sensor 516 to calculate the object height 620 (via, e.g., states 602-608) and scan the unrecognized object near the task location 116 of FIG. 1, such as using the scanning sensor 330 of FIG. 3. Accordingly, the robotic system 100 can derive the scanning positions/maneuver associated with lowering the unrecognized object toward the task location 116.

Operational Flow for Scanning and Registering During Task Execution

Figure 7:
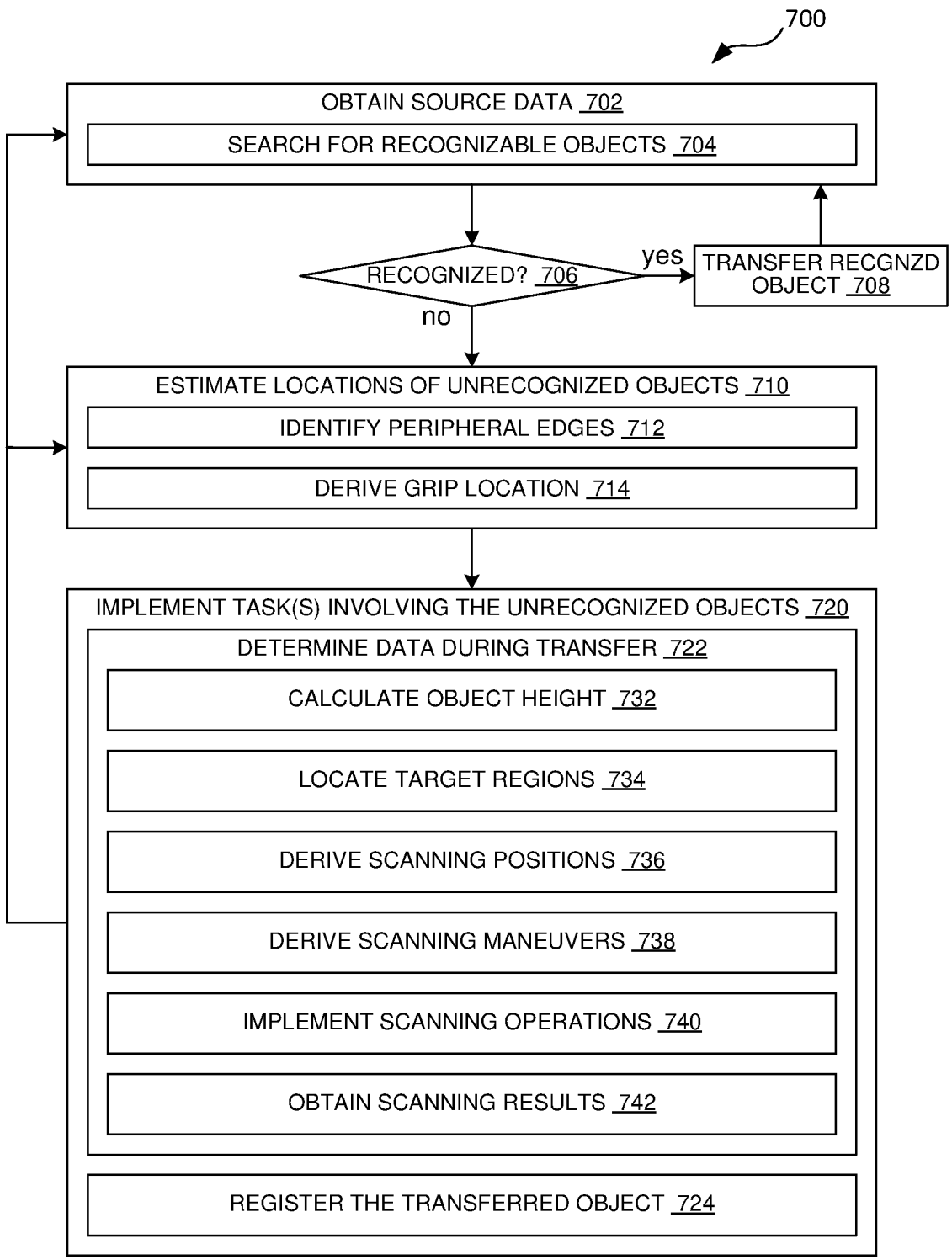
FIG. 7 is a flow diagram for a method of operating the robotic system of FIG. 1 in accordance with one or more embodiments introduced here.

FIG. 7 is a flow diagram for a method 700 of operating the robotic system 100 of FIG. 1 in accordance with one or more embodiments introduced herein. The method 700 can be for registering the unrecognized objects while performing a different task, such as for transferring the unrecognized objects from the start location 114 of FIG. 1 (e.g., the pallet and/or the container) to the task location 116 of FIG. 1 (e.g., the conveyor). The method 700 can be for obtaining information regarding the unrecognized objects using crossing sensors (e.g., the destination crossing sensor 316 of FIG. 3 and/or the source crossing sensor 516 of FIG. 5) and/or scanning sensors (e.g., the scanning sensor 330 of FIG. 3 and/or the scanning sensor 530 of FIG. 5). The obtained information can be used to register the unrecognized objects. The method 700 can be implemented based on executing the instructions stored on one or more of the storage devices 204 of FIG. 2 with one or more of the processors 202 of FIG. 2.

At block 702, the robotic system 100 (e.g., the processors 202 and/or the sensors 216 of FIG. 2 therein) can obtain source data. For example, the robotic system 100 can obtain initial 2D and/or 3D image data representative of the target stack 310 of FIG. 3 (e.g., before manipulating/transferring one or more objects) at the start location 114. In some embodiments, the robotic system 100 can operate the first imaging sensor 312 of FIG. 3, 512 of FIG. 5, and/or other sensors to generate the image data representative of top surfaces of objects (e.g., recognizable or otherwise) located at a start location 114. The robotic system 100 can communicate the image data between the sensors (e.g., the first imaging sensor 312/512) and the processors 202 for further processing.

At block 704, the robotic system 100 can process the obtained source data to search for recognizable objects. For example, the robotic system 100 can compare the source data or derivations thereof to the master data 252 of FIG. 2. In some embodiments, the robotic system 100 can compare one or more 2D image data from the first imaging sensor 312/512 (e.g., corresponding the top view of the target stack 310) to surface images of known or expected objects in the master data 252.

At block 706, the robotic system 100 can determine whether the source data or any portion thereof matches aspects of known or expected objects represented in the master data 252. The robotic system 100 can determine the recognized objects when the source data or derivations thereof matches entries (e.g., registration data representative of known objects) in the master data 252. Otherwise, the robotic system 100 can determine that one or more of the objects represented in the source data includes one or more of the unrecognized objects.

At block 708, when objects are recognized, the robotic system 100 can further process the recognized objects, such as by transferring the recognized objects to the task location 116 (e.g., the conveyor 306/506). The robotic system 100 can derive and/or implement motion plans to transfer the recognized objects to the task location 116. For example, the robotic system 100 can use the location of the recognized objects to derive corresponding locations for the robotic arm and/or the end-effector. The robotic system 100 can use the derived locations and current/projected locations for the robotic arm 302 of FIG. 3 or 502 of FIG. 5 and/or the end-effector 304 of FIG. 3/504 of FIG. 5 to further derive movements and/or corresponding actuator commands/settings. Similarly, the robotic system 100 can derive locations, movements, and/or corresponding actuator commands/settings for the robotic arm 302/502 and/or the end-effector 304/504 corresponding to lifting, horizontally displacing, lowering, and/or rotating the recognized objects for the transfer. The robotic system 100 can derive the motion plans based on combining the actuator commands/settings in sequence to transfer the recognized objects from the start location 114 to the task location 116. The robotic system 100 can further derive the motion plans based on combining the transfer commands/settings with a predetermined sequence of movements and/or corresponding actuator commands/settings to grip and/or release objects. In some embodiments, the robotic system 100 can derive the motion plans to release the object based on a triggering signal from the release point sensor 318 of FIG. 3 or 518 of FIG. 5. The release point sensor 318 can be configured to generate the triggering signal when the bottom portion of the transferred object crosses a sensing line/plane that corresponds to a safe release height above the placement surface.

In some embodiments, the robotic system 100 can implement/execute the motion plan based on communicating the commands/settings with the robotic arm 302 and/or the end-effector 304. Accordingly, the robotic system 100 can execute the derived motion plan based on operating the actuation devices 212 of FIG. 2 and/or the transport motors 214 of FIG. 2 of the robotic arm 302/502 and/or the end-effector 304/502 according to the derived commands/settings. In some embodiments, the method 700 can return to block 702 and obtain updated source data after transferring one or more of the recognized objects. The method can iteratively implement the above-described processes (e.g., blocks 702-808) until all of the exposed and/or accessible recognized objects (e.g., all recognized objects in the top layer of the target stack 310) are transferred to the task location 116.

When none of the remaining exposed and/or accessible objects are recognized (e.g., correspond to or match entries in the master data 252), the robotic system 100 can receive the image data representative of the unrecognized objects located at a start location 112. For example, the image data can represent one or more top surfaces of the remaining unrecognized objects.

At block 710, the robotic system 100 can estimate locations of the remaining unrecognized objects. For example, the robotic system 100 can use the imaging results from the first sensor 312/512 to estimate horizontal dimensions, locations, and/or boundaries of the unrecognized objects. To locate the unrecognized objects and/or boundaries thereof, the robotic system 100 can identify peripheral (exposed) edges and/or associated corners of objects at the start location 114, such as illustrated at block 712. For example, the robotic system 100 can identify the peripheral edges by determining differences in heights according to a 3D imaging output (e.g., a depth map) and/or by analyzing a 2D imaging output for patterns (e.g., continuous and/or linear patterns) in pixel brightness, pixel colors, height/depth measurements, etc. In some embodiments, the robotic system 100 can process the imaging output with Sobel filters to identify the exposed edges. The robotic system 100 can similarly identify the exposed outer corners as a junction or an intersection between two exposed edges having different orientations/slopes. Using the exposed corners, the robotic system 100 can derive a minimum viable region (MVR) that represents a minimum area that corresponds to one targeted unrecognized object. The MVR can represent an initial estimate of a continuous surface of the unrecognized object. Accordingly, as illustrated at block 714, the robotic system 100 can use the MVR to derive a grip location for contacting and gripping the unrecognized object via the end effector 304/504.

At block 720, the robotic system 100 can implement one or more tasks associated with the unrecognized objects. For example, the robotic system 100 can transfer the unrecognized object from the start location 114 to the task location 116. In some embodiments, the robotic system 100 can implement the tasks based on the image data. The robotic system 100 can identify a set of peripheral edges represented in the image data, such as for open or 3D edges (which can be edges identified in a 3D point cloud that indicate a step change in depth value on opposing sides of the 3D edge) and/or visual 2D edges corresponding to top surface(s) of the unrecognized objects. The robotic system 100 can derive the MVRs based on the identified peripheral edges. The robotic system 100 can use the MVRs to operate or execute instructions for operating the robotic arm 302/502 and/or the end-effector 304/504 to grip and transfer the unrecognized objects.

In some embodiments, the robotic system 100 can obtain additional data regarding the unrecognized objects during the implementation of the task. For example, the robotic system 100 can move (e.g., lift) or execute instructions to move the unrecognized objects to further separate the unrecognized objects from adjacent objects. The robotic system 100 can then reimage or execute instructions to reimage the target stack 310 and the moved object to further identify other peripheral edges (e.g., edges previously adjacent to or abutting other adjacent objects) of the moved object. Also, the robotic system 100 can calculate/finalize dimensions (e.g., widths and lengths) of the top surfaces of the unrecognized objects during/while implementing the initial portion of the tasks, such as after initially transferring the unrecognized object from the corresponding start locations 112.

For obtaining other additional data, the robotic system 100 can calculate object heights (e.g., the object height 320 of FIG. 3 and/or the object height 620 of FIG. 6) of the unrecognized objects as illustrated in block 732. The robotic system 100 can calculate the object heights during transfer of the unrecognized objects as described above. For example, the robotic system 100 can calculate the object heights based on tracking the gripper location and detecting crossing events while implementing operations to perform the tasks (by, e.g., generating/sending associated motion plans, commands, and/or settings). The crossing events can represent bottom portions of the unrecognized objects relative to (e.g., entering and/or exiting) the crossing references (e.g., the sensing lines) associated with the crossing sensors. In some embodiments, the robotic system 100 can use the crossing events associated with the bottom portions entering the sensing line/plane for the destination crossing sensor 316 of FIG. 3 while being lowered to the task location 116. In other embodiments, the robotic system 100 can use the crossing events associated with the bottom portions entering and/or exiting the sensing line/plane for source crossing sensor 516 of FIG. 5 while being lifted from the start location 114.

The robotic system 100 can use the event or the timing thereof to calculate the object heights. For example, the robotic system 100 can use the timing of the crossing event to determine the gripper location (e.g., the gripper height at the time of the crossing event). The robotic system 100 can calculate the object height as a difference between a known height of the crossing reference and the gripper location (e.g., the gripper height) at the time of the crossing event.

At block 734, the robotic system 100 can use the calculated object heights to locate target regions on the unrecognized objects during transfer. The target regions can represent portions of the unrecognized objects that were not represented in the initial imaging data (e.g., the top view image from the first imaging sensor 312 may not include a representation of the sides/vertically-oriented surfaces or bottom of the unrecognized objects). The robotic system 100 can estimate poses for the vertically-oriented surfaces and/or peripheral edges thereof that were visible in the initial imaging data.

As an illustrative example, the robotic system 100 can estimate current locations of the target regions (e.g., the vertically-oriented surfaces and/or portions thereof) based on the object heights and the dimensions/locations of the peripheral edges of the top surfaces. While implementing the task operations, the robotic system 100 can derive/track the current pose of the top surface of the unrecognized object under transfer based on the tracked gripper location. According to a template equation or process that estimates an overall shape of the unrecognized object (e.g., a box, a cylinder, etc.), the robotic system 100 can use the pose of the top surface and the object height to derive poses (e.g., locations and/or orientations) and/or locations of peripheral edges that define one or more vertically-oriented surfaces of the unrecognized object. Based on the derived poses of the peripheral edges, the robotic system 100 can locate the target regions as end portions (e.g., areas near peripheral edges) and/or corner portions of the vertically oriented surfaces of the unrecognized object. In some embodiments, the robotic system 100 can locate the target regions as the entirety of the vertically-oriented surfaces and/or other portions thereon that are likely to have identifiers (e.g., bar codes, QR codes, etc.) thereon.

The robotic system 100 may further calculate dimensions of the vertically-oriented surfaces. For example, the robotic system 100 can assume that the unrecognized object has a box or a cylindrical shape and set the object height as a common length for the vertically-oriented surfaces. The robotic system 100 can set a corresponding dimension of the top surface as the width for each of the vertically-oriented surfaces. Additionally or alternatively, the robotic system 100 may derive poses and/or dimensions for bottom surfaces of the unrecognized objects being transferred.

At block 736, the robotic system 100 can use the located target regions to derive the scanning positions (e.g., the scanning position 412 of FIG. 4C and/or the scanning position 652 of FIG. 6E). In deriving the scanning positions, the robotic system 100 can determine scanning zones for the available scanning sensors (e.g., the scanning sensor(s) 330 and/or the scanning sensor(s) 530). The scanning zone can represent a space detectable by the corresponding scanning sensor, such as a space in front of, within a threshold distance from, and/or within a threshold angle range about a detection portion of the sensor. The robotic system 100 can determine the scanning zones based on looking up or accessing predetermined data that locates or defines the scanning zones.

The robotic system 100 can derive the scanning positions for placing the target regions (e.g., the vertically-oriented surface and/or portions thereof) generally within the scanning zones and facing the sensors. In other words, the scanning positions can include the desired pose (e.g., position and/or orientation) of the end-effector 304/504 that presents one or more of the target regions to the scanning sensors.

As an illustrative example, the robotic system 100 can determine whether the entire vertically-oriented surface can be scanned at once by comparing the dimensions of the vertically-oriented surface to one or more predetermined dimension thresholds for the scanning zones. When the dimensions are less than the predetermined dimension thresholds, the robotic system 100 can derive the scanning position that positions a center portion of the vertically-oriented surface (e.g., a target location that includes a mid-point between the derived edges thereof) and/or one of the derived edges (e.g., a target location that includes a mid-point of the top edge) at a predetermined location relative to the scanning sensor. For example, the robotic system 100 can position the vertically-oriented surface centered and separated by a predetermined distance before the scanning sensor.

When one or more of the dimensions of the vertically-oriented surface are greater than one or more of the predetermined dimension thresholds, the robotic system 100 can determine that the vertically-oriented surface of the unrecognized object is too large to be accurately imaged or captured as a single image. Accordingly, the robotic system 100 can derive one or more scanning positions that present the target locations (e.g., separate corners/end portions) to the scanning sensor. In other words, the robotic system 100 can derive the scanning positions for the end-effector 304/504 that places the targeted portions of the vertically-oriented surface in the scanning zone and facing the scanning sensor. For example, the robotic system 100 can select a set of target regions configured to fully cover or capture the vertically-oriented surface according to the dimension(s) of the vertically-oriented surface that exceeded the threshold. The individual target regions in the set can each be configured to cover different portions so that in sum, the set captures an entirety of the vertically-oriented surface. The robotic system 100 can derive a reference location for each of the selected target regions according to one or more peripheral edges of the vertically-oriented surface and/or corresponding dimensions thereof. The robotic system 100 can derive a scanning position corresponding to each of the selected target regions for the corresponding reference location at a known location relative to the scanning sensors. For example, the robotic system 100 can derive a first scanning position that corresponds to presenting a first corner or a first end portion of the vertically-oriented surface to the scanning sensor. The robotic system 100 can similarly derive a second scanning position that corresponds to presenting a second corner or a second end portion.

The robotic system 100 can further derive scanning positions associated with a bottom surface of the unrecognized object. For example, the robotic system 100 can derive the scanning position to place the bottom surface over an upward-facing scanning sensor. In some embodiments, the robotic system 100 can determine a scanning sequence of surfaces and/or portions within one or more surfaces. For example, the robotic system 100 can calculate confidence values that represent a likelihood that the identifier is on a correspond target portion. In some embodiments, the robotic system 100 can calculate the confidence values according to one or more visual characteristics of the top surface. For example, the robotic system 100 can increase the confidence values when visual characteristics, such as absence of writing/logos and/or existence of a crease or a line separating rectangular flaps, indicate that a top surface of the unrecognized object is shown in the initial image. The robotic system 100 can sequence the scanning positions according to the likelihood values.

In some embodiments, the robotic system 100 can derive scanning maneuvers (e.g., the scanning maneuver 414 of FIG. 4C and/or the scanning maneuver 654 of FIG. 6E) as illustrated at block 738. The robotic system 100 can derive the scanning maneuvers based on the scanning positions. For example, the robotic system 100 can derive the scanning maneuver to horizontally and/or vertically transfer the end effector 304 to go from one scanning position to another. Also, the robotic system 100 can derive the scanning maneuver to rotate the end-effector, and thereby the unrecognized object, about a vertical axis (e.g., the z-axis) after the placing the end-effector at the scanning position. By implementing the scanning maneuvers, the robotic system 100 can transfer the unrecognized object to present multiple portions on a surface and/or multiple surfaces to the scanning sensor.

At block 740, the robotic system 100 can implement scanning operations, such as by communicating commands, settings, and/or motions plans to corresponding robotic units or components therein. The robotic system 100 can implement the scanning operations while or in the middle of implementation of the tasks. In some embodiments, for example, the robotic system 100 can pause the implementation of the tasks, implement the scanning operations, and then resume the tasks. In other embodiments, the robotic system 100 can generate and implement the task in phases. Initially, the robotic system 100 can implement a first portion of the task to transfer the unrecognized object until the crossing event. According to the crossing event, the robotic system 100 can implement the scanning operations based on the above described processing results. After implementing the scanning operations, the robotic system 100 can generate and implement a remainder of the task. Further, the task and/or implementing the remainder of the task can include further lifting of the unrecognized object, horizontally transferring the unrecognized object to be over the task location 116, lowering the unrecognized object to the task location 116, and/or releasing the unrecognized object at or over the task location 116.

The robotic system 100 can implement the scanning operations by generating/sending commands, settings, and/or motion plans that operate the robotic arm 302/502 and/or the end-effector 304/504 according to the scanning position(s). For example, the one or more processors 202 of FIG. 2 can determine and communicate commands, settings, and/or motion plans that, when executed by the robotic arm 302/502 and/or the end-effector 304/504, places the end-effector 304/504 at the scanning position. Accordingly, the robotic system 100 can present the target portion of the unrecognized object before the scanning sensor(s). Also, the robotic system 100 can implement the scanning maneuvers after placing the end-effector 304/504 at the scanning position.

The robotic system 100 can further operate the scanning sensors according to the operation of the robotic arm 302/502 and/or the end-effector 304/504. For example, the robotic system 100 can activate the scanning sensor after placing the end-effector 304/504 at each of the scanning positions. Also, the robotic system 100 can activate the scanning sensor (by, e.g., generating activation commands) after placing the end-effector 304/504 at one scanning position, and leave the scanning sensor active while implementing the scanning maneuver. Thus, the robotic system 100 can scan one or more portions of the unrecognized object that were not visible/accessible in the initial imaging data.

At block 742, the robotic system 100 can receive one or more results associated with the scanning operation. For example, the robotic system 100 can receive from the scanning sensor a status, a scanned value, and/or a time stamp. The status can represent a successful scan or a scan error, such as due to the identifier not being present within the scanning zone. The scanned value can include the value represented by the identifier and/or the image captured by the scanning sensor. The time stamp can correspond to a time when the scanning value was generated by the scanning sensor and/or when the scanning value was received by the one or more processor 202.

The robotic system 100 can use the obtained results to generate a scanning result. The scanning result can include the value, the image, the time stamp, and/or a processing result thereof. For example, the scanning result can include the value represented by the bar code, the QR code, the RF identifier transmitter, etc. Also, the scanning result can include an estimated location of the identifier, which can be derived based on the current position of the end-effector 304/504 corresponding to the time stamp. In some embodiments, the robotic system 100 can visually process (via, e.g., predetermined visual pattern recognition processes) a scanned image from the scanning sensors to locate the identifier and its represented value. Alternatively or additionally, the robotic system 100 can identify the peripheral edges in the scanned image and then crop out a portion thereof outside the peripheral edges. The robotic system 100 can generate the scanning result including the cropped image that visually represents the scanned surface.

At block 724, the robotic system 100 can register the transferred object (e.g., the unrecognized object), such as based on creating and/or populating a new instance of the registration data 254 corresponding thereto. The new registration data 254 can represent a new record for the unrecognized object being transferred. In some embodiments, the robotic system 100 can additionally compare the obtained information, including the cropped image or the identifier value, with the entries in the master data 252. When the comparison matches, the robotic system 100 can adjust the recognition status of the object under transfer accordingly. Otherwise, the robotic system 100 can continue to register the unrecognized object.

In registering the unrecognized object, the robotic system 100 can store in the master data 252 information associated with the identifier and/or other physical traits. For example, the robotic system 100 can create an entry for the registration data 254 during or before transfer. The robotic system 100 can store the obtained data, such as the top view, the edge lengths, the object height, or a combination thereof, in the created entry. Also, the robotic system 100 can store the scanning results in the registration data 254. The robotic system 100 can finalize and/or store the registration data 254 when the unrecognized object is placed on the task location 116 and/or released from the end-effector 304/504.

While or after registering the object, the robotic system 100 can complete the task. For example, the robotic system 100 can stop the scanning operation when the scanning sensor successfully returns the identifier value or the scanned image. The robotic system 100 can then continue implementing the remaining portions of the task and place the unrecognized object at the task location 116. In some embodiments, the robotic system 100 can obtain the scanning result and/or register the transferred object in parallel with the completion of the task.

In some embodiments, the method 700 can iteratively transfer and register a group of unrecognized objects from one image. Accordingly, after transferring and registering one unknown object, the method 700 can determine a new registration target from amongst the remaining unrecognized objects as illustrated by a feedback path to block 710. In some embodiments, as illustrated by a feedback path to block 702, the method 700 can include reimaging the start location 114 after transferring and registering an unknown object.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
   receiving an image data representative of an unrecognized object located at a start location;
   implementing operations for transferring the unrecognized object to a task location;
   deriving a location of a surface or a portion thereof of the unrecognized object based on the image data;

using the image data, deriving a scanning position based on the location of the surface of the unrecognized object;

implementing operations for positioning the unrecognized object to expose the surface and/or one or more portions of the unrecognized object to a sensor, during the operations for transferring, based on the scanning position;

generating a scanning result representative of an output from the sensor scanning the surface and/or the one or more portions; and creating new registration data representative of a new record for the unrecognized object, wherein the new registration data includes the scanning result.

2. The method of claim 1, further comprising:

generating one or more commands for operating the sensor based on implementing the operations for positioning the unrecognized object to expose the surface to the sensor; and wherein:

the scanning result is representative of a feature on or accessible through the surface of the unknown object.

3. The method of claim 1, further comprising:

deriving a scanning maneuver based on the scanning position, wherein the scanning maneuver is for positioning the unrecognized object to expose multiple portions thereof to the sensor; and implementing operations according to the scanning maneuver for exposing the multiple portions of the unrecognized object to the sensor to scan the multiple portions.

4. The method of claim 3, wherein the scanning maneuver corresponds to rotating the unrecognized object about one or more of the axes of the unrecognized object.

5. The method of claim 3, further comprising:

calculating a dimension of the surface based on an object height and/or a first set of peripheral edges of the unknown object;

deriving a second scanning position based on the location of the surface when the dimension exceeds a threshold, wherein the scanning position and the second scanning position are for exposing different portions of the unrecognized object to the sensor; and wherein:

the scanning maneuver is for positioning the unrecognized object from the scanning position to the second scanning position while the scanner is configured to continuously perform a scanning operation.

6. A robotic system comprising:

at least one processor; and at least one memory device connected to the at least one processor and having stored thereon instructions executable by the processor for:

receiving an image data representative of an unrecognized object located at a start location;

implementing operations for transferring the unrecognized object to a task location;

while implementing the operations for transferring the unrecognized object, implement operations for scanning at least one portion of the unrecognized object that was unrecognizable or hidden in the image data;

generating a scanning result based on implementing the operations for scanning the at least one portion of the unrecognized object; and creating new registration data representative of a new record for cataloging the unrecognized object, wherein the new registration data includes the scanning result.

7. The robotic system of claim 6, wherein the at least one memory device includes instructions for:

obtaining additional data corresponding to the unrecognized object while implementing the transfer operations;

deriving a scanning position based on the additional data, wherein the scanning position represents a pose for presenting to a sensor the at least one portion of the unrecognized object;

generating the scanning result based on a command and/or a setting corresponding to the scanning operation for positioning the unrecognized object according to the scanning position, wherein the scanning operation is coordinated with operating the sensor.

8. The robotic system of claim 7, wherein:

the image data depicts a surface of the unrecognized object;

the at least one memory device includes instructions for:

identifying one or more locations of corresponding to the surface or a portion thereof based on the image data;

deriving a target location of the unrecognized object based on the surface or the portion thereof, wherein the target location represents a position of the at least one portion of the unrecognized object; and deriving the scanning position based on the target location and a scanning zone located about the sensor.

9. The robotic system of claim 7, wherein the at least one portion of the unrecognized object includes a surface or a peripheral portion thereof of the unrecognized object.

10. The robotic system of claim 9, wherein:

the scanning position corresponds to a first corner of the surface; and the at least one memory device includes instructions for implementing operations for scanning based on:

a second scanning position that represents a pose for exposing to the sensor a second corner of the surface; and a scanning maneuver derived according to the scanning position and the second scanning position for scanning between the first corner and the second corner of the surface.

11. The robotic system of claim 10, wherein the at least one memory device includes instructions for generating the scanning result including an identifier location based on:

receiving an identifier value resulting from scanning an identifier accessible on or through the surface;

determining a gripper location at a time of receiving the identifier value;

deriving an identifier location based on the gripper location, wherein the identifier location represents a position of the identifier relative to the surface; and generating the scanning result including the identifier value and the identifier location.

12. The robotic system of claim 7, wherein the at least one memory device includes instructions for implementing operations for scanning at least one portion of the unrecognized object based on further generating a command and/or a setting for rotating the unrecognized object about one or more axes to expose multiple surfaces to the sensor.

13. The robotic system of claim 6, wherein the at least one memory device includes instructions for:

receiving a surface image, wherein the surface image is a visual representation of the at least one portion of the unrecognized object; and generating the scanning result based on the surface image.

14. The robotic system of claim 13, wherein the at least one memory device includes instructions for:

determining an object feature based on visually processing the surface image, wherein the object feature corresponds to an identifier exposed on the depicted surface;

deriving a feature location based on visually processing the surface image, wherein the feature location represents a position of the object feature on the unrecognized object; and generating the scanning result including the object feature and the feature location.

15. The robotic system of claim 13, wherein the at least one memory device includes instructions for:

identifying peripheral edges of the unrecognized object in the surface image; and generating the scanning result including a cropped portion of the surface image within the identified peripheral edges.

16. A tangible, non-transient computer-readable medium having processor instructions stored thereon that, when executed by a robotic system via one or more processors thereof, cause the robotic system to perform a method, the method comprising:

receiving an image data representative of an unrecognized object located at a start location;

implementing operations for transferring the unrecognized object to a task location;

deriving a location of a surface or a portion thereof of the unrecognized object based on the image data;

using the image data, deriving a scanning position based on the location of the surface of the unrecognized object;

implementing operations for positioning the unrecognized object to expose the surface and/or one or more portions of the unrecognized object to a sensor, during the operations for transferring, based on the scanning position;

generating a scanning result representative of an output from the sensor scanning the surface and/or the one or more portions; and creating new registration data representative of a new record for the unrecognized object, wherein the new registration data includes the scanning result.

17. The tangible, non-transient computer-readable medium of claim 16 having processor instructions to perform the method that includes:

generating one or more commands for operating the sensor based on implementing the operations for positioning the unrecognized object to expose the surface to the sensor; and wherein:

the scanning result is representative of a feature on or accessible through the surface of the unknown object.

18. The tangible, non-transient computer-readable medium of claim 16 having processor instructions to perform the method that includes:

deriving a scanning maneuver based on the scanning position, wherein the scanning maneuver is for positioning the unrecognized object to expose multiple portions thereof to the sensor; and implementing operations according to the scanning maneuver for exposing the multiple portions of the unrecognized object to the sensor to scan the multiple portions.

19. The tangible, non-transient computer-readable medium of claim 18 having processor instructions to perform the method, wherein the scanning maneuver corresponds to rotating the unrecognized object about one or more of the axes of the unrecognized object.

20. The tangible, non-transient computer-readable medium of claim 18 having processor instructions to perform the method that includes:

calculating a dimension of the surface based on an object height and/or a first set of peripheral edges of the unknown object;

deriving a second scanning position based on the location of the surface when the dimension exceeds a threshold, wherein the scanning position and the second scanning position are for exposing different portions of the unrecognized object to the sensor; and wherein:

the scanning maneuver is for positioning the unrecognized object from the scanning position to the second scanning position while the scanner is configured to continuously perform a scanning operation.

* * * * *